(12) United States Patent
Stewart et al.

(10) Patent No.: US 9,316,397 B2
(45) Date of Patent: Apr. 19, 2016

(54) SYSTEM AND METHOD FOR SEALING A FUEL NOZZLE

(71) Applicant: General Electric Company, Schenectady, NY (US)

(72) Inventors: Jason Thurman Stewart, Greenville, SC (US); Christopher Paul Keener, Greenville, SC (US); Heath Michael Ostebee, Greenville, SC (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 13/838,363

(22) Filed: Mar. 15, 2013

(65) Prior Publication Data

US 2014/0338355 A1   Nov. 20, 2014

(51) Int. Cl.
*F23R 3/28* (2006.01)
*F02C 7/28* (2006.01)

(52) U.S. Cl.
CPC . *F23R 3/283* (2013.01); *F02C 7/28* (2013.01); *F23R 2900/00012* (2013.01)

(58) Field of Classification Search
CPC ............ F23R 3/28; F23R 3/283; F23R 3/286; F23R 3/30; F23R 3/32; F23R 2900/00012; F02C 7/28
USPC ........... 60/734, 737, 738, 739, 740, 796, 797, 60/799, 800
See application file for complete search history.

(56) References Cited

U.S. PATENT DOCUMENTS

| | | | |
|---|---|---|---|
| 4,100,733 A | 7/1978 | Striebel et al. | |
| 4,845,952 A * | 7/1989 | Beebe | 60/737 |
| 6,282,904 B1 | 9/2001 | Kraft et al. | |
| 6,438,961 B2 | 8/2002 | Tuthill et al. | |
| 6,446,439 B1 | 9/2002 | Kraft et al. | |
| 6,634,175 B1 | 10/2003 | Kawata et al. | |
| 6,672,073 B2 * | 1/2004 | Wiebe | 60/796 |
| 7,690,065 B2 | 4/2010 | Muller et al. | |
| 7,752,850 B2 | 7/2010 | Laster et al. | |
| 8,042,339 B2 | 10/2011 | Lacy et al. | |
| 8,147,121 B2 | 4/2012 | Lacy et al. | |
| 8,234,872 B2 | 8/2012 | Berry et al. | |
| 8,312,724 B2 | 11/2012 | Dai et al. | |
| 8,322,143 B2 | 12/2012 | Uhm et al. | |
| 8,424,311 B2 | 4/2013 | York et al. | |
| 8,438,852 B2 | 5/2013 | Valeev et al. | |
| 8,701,419 B2 | 4/2014 | Hughes | |
| 8,789,372 B2 | 7/2014 | Johnson et al. | |
| 8,904,797 B2 | 12/2014 | Berry et al. | |
| 8,943,833 B2 | 2/2015 | Tuthill et al. | |
| 2007/0151255 A1 * | 7/2007 | Johnson et al. | 60/776 |
| 2007/0277530 A1 | 12/2007 | Dinu et al. | |
| 2009/0188255 A1 * | 7/2009 | Green et al. | 60/737 |
| 2010/0067404 A1 | 3/2010 | Van Wageningen et al. | |
| 2010/0175380 A1 * | 7/2010 | Davis et al. | 60/734 |
| 2010/0186413 A1 * | 7/2010 | Lacy et al. | 60/740 |
| 2012/0055167 A1 | 3/2012 | Johnson et al. | |
| 2012/0056167 A1 | 3/2012 | Lau et al. | |
| 2013/0025283 A1 | 1/2013 | Berry et al. | |

(Continued)

*Primary Examiner* — Steven Sutherland
(74) *Attorney, Agent, or Firm* — Fletcher Yoder P.C.

(57) ABSTRACT

A system including a multi-tube fuel nozzle, including a first plate having a first plurality of openings, a plurality of tubes extending through the first plurality of openings in the first plate, wherein each tube of the plurality of tubes includes an air inlet, a fuel inlet, and a fuel-air mixture outlet, and a resilient metallic seal disposed along the first plate about the plurality of tubes.

27 Claims, 16 Drawing Sheets

(56) References Cited

U.S. PATENT DOCUMENTS

| | | |
|---|---|---|
| 2013/0025285 A1 | 1/2013 | Stewart et al. |
| 2013/0061594 A1 | 3/2013 | Stewart |
| 2013/0086912 A1 | 4/2013 | Berry |
| 2013/0232979 A1 | 9/2013 | Singh |
| 2013/0299602 A1 | 11/2013 | Hughes et al. |
| 2014/0260267 A1 | 9/2014 | Melton et al. |
| 2014/0260268 A1 | 9/2014 | Westmoreland et al. |
| 2014/0260271 A1 | 9/2014 | Keener |
| 2014/0260276 A1 | 9/2014 | Westmoreland et al. |
| 2014/0260299 A1 | 9/2014 | Boardman et al. |
| 2014/0260300 A1 | 9/2014 | Chila et al. |
| 2014/0260315 A1 | 9/2014 | Westmoreland et al. |
| 2014/0283522 A1 | 9/2014 | Boardman et al. |
| 2014/0338338 A1 | 11/2014 | Chila et al. |
| 2014/0338339 A1 | 11/2014 | Westmoreland et al. |
| 2014/0338340 A1 | 11/2014 | Melton et al. |
| 2014/0338344 A1 | 11/2014 | Stewart |
| 2014/0338354 A1 | 11/2014 | Stewart |
| 2014/0338356 A1 | 11/2014 | Keener |

* cited by examiner

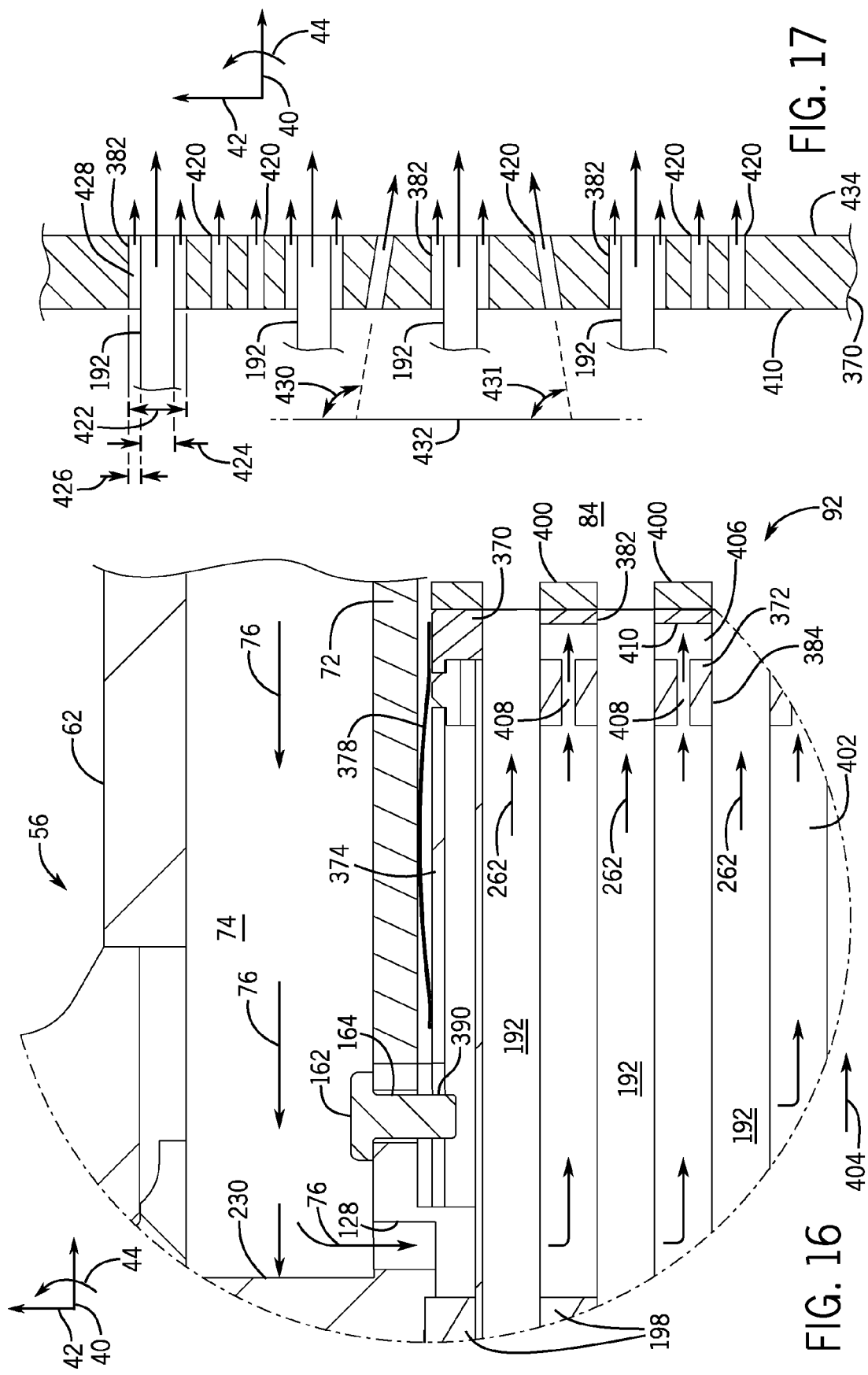

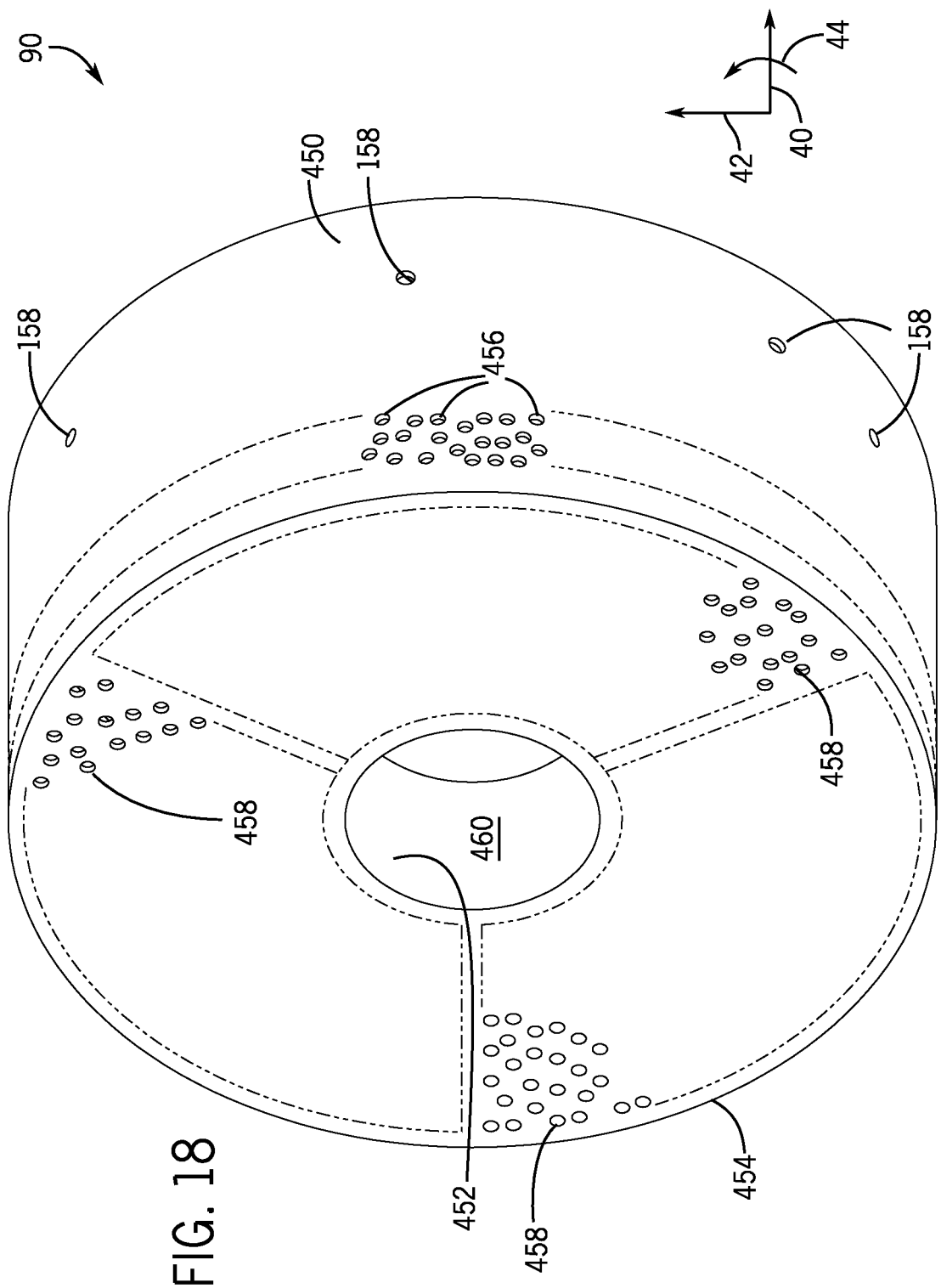

SYSTEM AND METHOD FOR SEALING A FUEL NOZZLE

BACKGROUND

The subject matter disclosed herein relates to a gas turbine engine and, more specifically, to a fuel nozzle for a combustor of the gas turbine engine.

A gas turbine engine generally includes a turbine and a combustor with a fuel nozzle. A mixture of fuel and air combusts within the combustor to generate hot combustion gases, which drive rotation of turbine blades in the turbine and, in turn, a shaft coupled to a load, e.g., an electrical generator. The fuel-air mixture (e.g., uniformity of fuel-air mixing in the combustor) can significantly impact power output, efficiency, and exhaust emissions of the gas turbine engine. In addition, combustion of the fuel-air mixture in the combustor can cause combustion dynamics, vibration, and thermal gradients, which can impact the performance and life of various combustor components, such as the fuel nozzle. For example, the fuel nozzle may be subjected to thermal growth due to its close proximity to the hot products of combustion. These combustion-related effects can complicate the design of gas turbine engines, particularly the combustors and fuel nozzles.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system including a multi-tube fuel nozzle, including a first plate having a first plurality of openings, a plurality of tubes extending through the first plurality of openings in the first plate, wherein each tube of the plurality of tubes includes an air inlet, a fuel inlet, and a fuel-air mixture outlet, and a resilient metallic seal disposed along the first plate about the plurality of tubes.

In another embodiment, a system including a multi-tube fuel nozzle, including a plurality of fuel-air mixing tubes, wherein each tube of the plurality of fuel-air mixing tubes includes an air inlet, a fuel inlet, and a fuel-air mixture outlet, and a resilient metallic seal disposed about the plurality of tubes, wherein the resilient metallic seal includes at least one axially adjustable turn.

In another embodiment, a method including sealing a multi-tube fuel nozzle to a surrounding structure via a resilient metallic seal, wherein the multi-tube fuel nozzle includes a plurality of tubes each having an air inlet, a fuel inlet, and a fuel-air mixture outlet, and expanding or contracting the resilient metallic seal, while sealing, in response to thermal expansion or thermal contraction of the plurality of tubes or the surrounding structure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 16 is a sectional view of the micro mixer system in FIG. 9 along line 16-16, according to an embodiment;

FIG. 17 is a sectional view of an aft plate accordingly to an embodiment;

FIG. 18 is a rear perspective view of an inlet flow conditioner of a fuel nozzle according to an embodiment;

DETAILED DESCRIPTION

Figure 1:
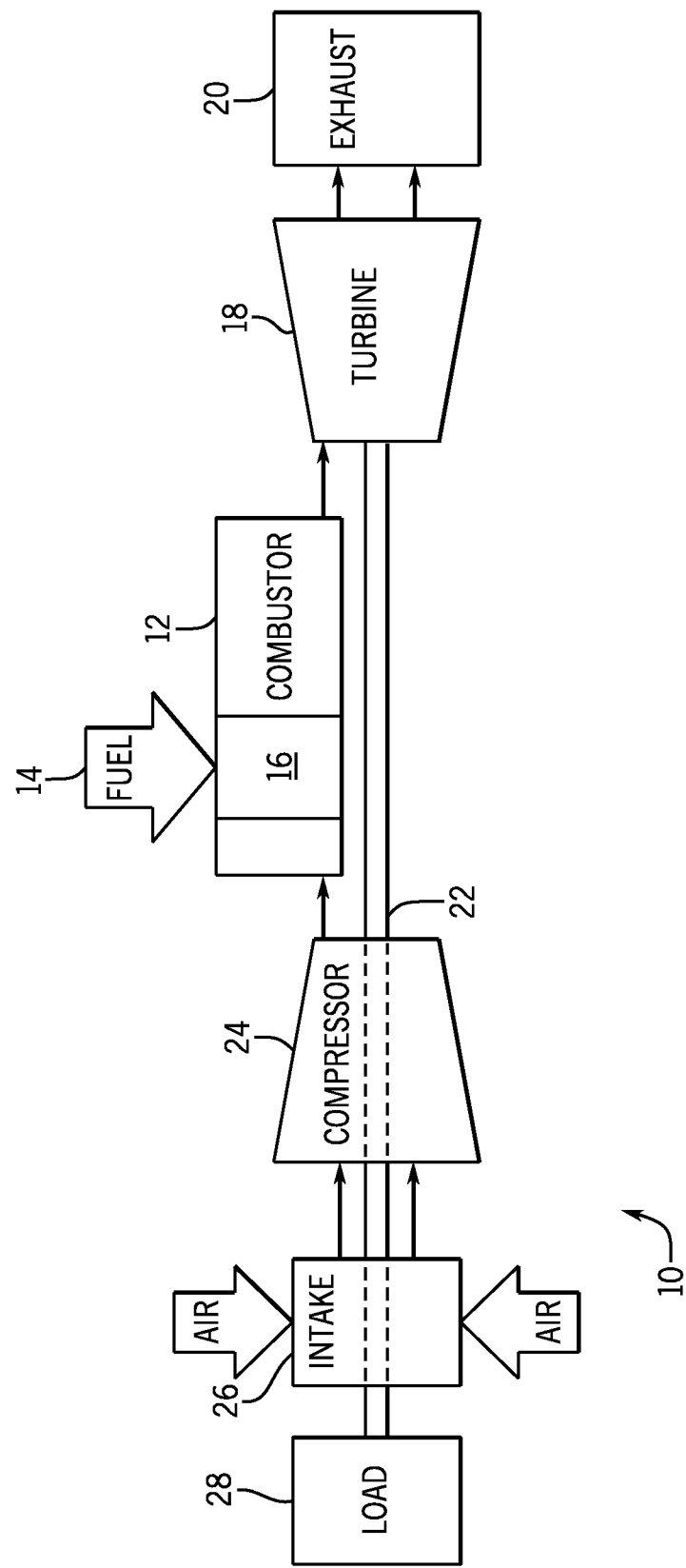
FIG. 1 is a block diagram of a turbine system having a micro-mixer system according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide a micro-mixer system that includes an inlet flow conditioner, an aft plate assembly, a multi-tube fuel nozzle (e.g., a cylindrical or sector shaped fuel nozzle), a resilient metallic seal (e.g., a metallic bellows), and a fuel nozzle housing. In certain embodiments, the multi-tube fuel nozzle may include 5 to 1000, 10 to 500, 20 to 250, or 30 to 100 mixing tubes, which are generally parallel with one another in one or more groups (e.g., 1, 2, 3, 4, 5, 6, or more groups). Each mixing tube may be approximately 0.25 to 5, 0.5, to 3, or 1 to 2 centimeters in diameter. The plurality of mixing tubes of the multi-tube fuel nozzle enable small scale mixing (e.g., micro-mixing) of fuel and air, thereby helping to improve the uniformity of fuel-air mixing in the combustor.

The fuel nozzle housing supports the micro-mixer system by coupling to the inlet flow conditioner and aft plate assembly; and by receiving the multi-tube fuel nozzles. When assembled, the inlet flow conditioner and aft plate assembly cover the multi-tube fuel nozzles by coupling to opposite ends of the fuel nozzle housing. In certain embodiments, the fuel nozzle housing may include a first ring structure (i.e., an inner ring structure) and a second ring structure (i.e., an outer ring structure) coupled together by struts. The fuel nozzle housing may receive the multi-tube fuel nozzles within the inner ring structure and deliver fuel radially to the multi-tube fuel nozzles. Specifically, the fuel nozzle housing may be configured to deliver fuel in a generally radial direction through the outer ring structure, the inner ring structure, and through the struts that couple the inner ring structure to the outer ring structure. The radial delivery of fuel enables the gas turbine system to include a simple end plate at the end of the combustor (e.g., an end plate with minimal or no fuel delivering apertures). The radial fuel delivery may also increase space usage by the fuel nozzles within the combustor (i.e., the tubes of the multi-tube fuel nozzles may occupy the space previously used for fuel delivery through the end plate).

The struts in the fuel nozzle housing may include fuel carrying struts and/or non-fuel carrying struts. The fuel nozzle housing struts enable radial fuel delivery and may increase resistance to vibration (e.g., resonant vibration of the micro-mixer system). For example, the struts may increase the stiffness of the fuel nozzle housing and/or change the resonant frequency of the micro-mixer system. In addition, the struts may be aerodynamically shaped (e.g., an airfoil shape) to reduce the wake of compressed air passing between the outer ring structure and the inner ring structure. A reduction in the wake may also reduce vibration in the micro-mixer system caused by compressed airflow through the combustor.

Finally, the fuel nozzle housing enables a modular micro-mixer system. For example, the fuel nozzle housing may include a plurality of radial apertures that enable components of the micro-mixer system to easily attach and detach. Specifically, the apertures may receive pins or other fasteners that couple the inlet flow conditioner and the aft plate assembly to the fuel nozzle housing. Simple attachment and detachment of the inlet flow conditioner and aft plate assembly enable easy access to, maintenance of, or replacement of multi-tube fuel nozzles, the inlet flow conditioner, the aft plate assembly, and the resilient metallic seal.

In operation, the micro-mixer system mixes air and fuel in a multi-tube fuel nozzle to create a fuel-air mixture. The fuel air mixture combusts in the combustor to create combustion gases that drive a turbine. The multi-tube fuel nozzle may include a first plate with a first group of openings, a second plate with a second group of openings, and multiple tubes extending through the groups of openings in the first and second plates. Each tube of the tubes may have an air inlet at a first axial end, a fuel inlet between first and second axial ends, and a fuel-air mixture outlet at the second axial end. In particular, as discussed below, each tube is configured to premix (e.g., mixing on a small scale, or micro-mixing) fuel and air within the respective tube, and then output a fuel-air mixture for combustion in a combustor (e.g., a turbine combustor of a gas turbine engine). The temperature of the air entering the multi-tube fuel nozzle may be somewhat elevated, e.g., approximately 200 to 500 degrees Celsius due to the work performed on the air through compression, while the fuel entering the tubes may be significantly cooler, e.g., approximately 20 to 250 degrees Celsius. In addition, the tubes may be susceptible to heating by the hot combustion products due to their proximity to the combustion reaction. Thus, during operation (e.g., combustion in a combustion chamber), various components of the multi-tube fuel nozzle, housing structure, combustor, fuel supply conduits, mounts, etc., may undergo thermal expansion at different rates, thereby causing the more rapidly expanding components to impart forces against more slowly expanding components. For example, the multiple tubes of the multi-tube fuel nozzle may undergo a greater rate of thermal expansion than the surrounding fuel housing structure, mounts, combustor, and/or other structures.

In order to mitigate the induced stresses caused by thermal expansion and/or contraction of the component materials, the micro-mixer system may include a resilient metallic seal (e.g., a metallic bellows). For example, the metallic bellows may have a wall (e.g., annular or non-annular wall) disposed about a space containing the plate and tube assembly, wherein the wall has one or more turns or bends (e.g., a wave, oscillating, or zigzagging pattern) that are able to resiliently fold and unfold to enable expansion and contraction of the wall of the metallic bellows. Thus, the resilient adjustability (e.g., folding and unfolding of the wall) enables the metallic bellows to accommodate thermal expansion and contraction between the plate, the tube assembly, and the surrounding components. Without the resilient metallic seal (e.g., metallic bellows), axial displacement may result in stresses within the multi-tube fuel nozzle components, fuel/air leakages, loss of pressure within the combustor, or other negative effects. When placed between the first plate and the housing structure, the resilient metallic seal (e.g., metallic bellows) may expand or contract in an axial direction to lessen the effects of thermal expansion or contraction of the tubes, while maintaining a continuous working seal between chambers within the fuel nozzle. Additionally, the use of the resilient metallic seal may result in a more modular design, and thus, ease of construction, simple assembly/disassembly procedures, cost effective equipment replacement, and less maintenance down-time.

The micro-mixer system may also include the aft plate assembly to provide additional protection of the multi-tube fuel nozzles (i.e., resist thermal stresses). Specifically, the aft plate assembly may block direct contact between the combustion reaction in the combustor and the multi-tube fuel nozzles, as well as form an air cooling chamber for convectively cooling the multi-tube fuel nozzles. While the air cooling chamber convectively cools the multi-tube fuel nozzles, the aft plate assembly blocks direct contact between the combustion reaction and the multi-tube fuel nozzle. Specifically, the aft plate assembly includes an aft plate with apertures that enable the fuel air mixture to exit the multi-tube fuel nozzles, while simultaneously covering the multi-tube fuel nozzles to resist heat transfer from the combustion reaction. In some embodiments, the aft plate may include a thermal barrier coating to increase thermal resistance to the combustion reaction. In still other embodiments, the aft plate may include effusion cooling apertures that receive airflow from the air cooling chamber. The effusion cooling apertures form a cooling film on the aft plate, which protects the aft plate and reduces heat transfer. In other embodiments, the aft plate assembly may include an impingement plate configured to impinge cooling airflow against the aft plate before the airflow exits effusion cooling apertures, thus increasing thermal protection of the aft plate and reducing heat transfer to the multi-tube fuel nozzles. In operation, the impingement plate accelerates the cooling airflow as it flows through impingement holes. The impingement holes direct the cooling airflow into contact with the aft plate, where the cooling airflow absorbs heat before passing through the aft plate (e.g., through effusion cooling apertures and/or space between the aft plate and the tubes of the multi-tube fuel nozzles).

Finally, the micro-mixer system may include the inlet flow conditioner. The inlet flow conditioner is configured to filter airflow entering the micro-mixer system and evenly distribute the airflow into each of the tubes of the multi-tube fuel nozzles. In order to filter the airflow into the micro-mixer system, the inlet flow conditioner may include apertures that are smaller than the apertures in the tubes of the multi-tube fuel nozzles. Accordingly, debris capable of entering the tubes of the multi-tube fuel nozzle may be blocked by the inlet flow conditioner. As mentioned above, the inlet flow conditioner may evenly distribute airflow into each of the tubes of the multi-tube fuel nozzles. Specifically, the inlet flow conditioner may include radial apertures and turning guides that channel airflow to the outermost tubes of the multi-tube fuel nozzles. However, in other embodiments, the inlet flow conditioner may include angled apertures, in combination with or without turning guides, in order to channel airflow into the outermost tubes of the multi-tube fuel nozzles. By evenly distributing the airflow to the tubes of the multi-tube fuel nozzles, the multi-tube fuel nozzles mix and distribute the fuel-air mixture in a suitable ratio for optimal combustion, emissions, fuel consumption, and power output. Specifically, the micro-mixer system may reduce levels of undesirable emissions (e.g., NOx, CO, $CO_2$, etc.) from a gas turbine system.

FIG. 1 is a block diagram of a gas turbine system 10. As described in detail below, the disclosed turbine system 10 may employ one or more radially supported fuel nozzles (e.g., multi-tube fuel nozzles). The turbine system 10 may use liquid or gas fuel, such as natural gas and/or a hydrogen-rich synthetic gas, to drive the turbine system 10. As depicted, the combustor 12 intakes a fuel supply 14, mixes the fuel with air for distribution and combustion within the combustor 12. Specifically, the combustor 12 includes a micro-mixer system 16 that radially supports and provides fuel to multi-tube fuel nozzles. In certain embodiments, the micro-mixer system 16 includes multiple fuel nozzles arranged around a central fuel nozzle. The multi-tube fuel nozzles mix and distribute the fuel-air mixture in a suitable ratio for optimal combustion, emissions, fuel consumption, and power output. Specifically, the micro-mixer system 16 reduces levels of undesirable emissions (e.g., NOx, CO, $CO_2$, etc.) from the turbine system 10.

During operation, the fuel-air mixture combusts in a chamber within the combustor 12, thereby creating hot pressurized exhaust gases. The combustor 12 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and directing the air into the multi-tube fuel nozzles and/or combustor 12. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10.

Figure 2:
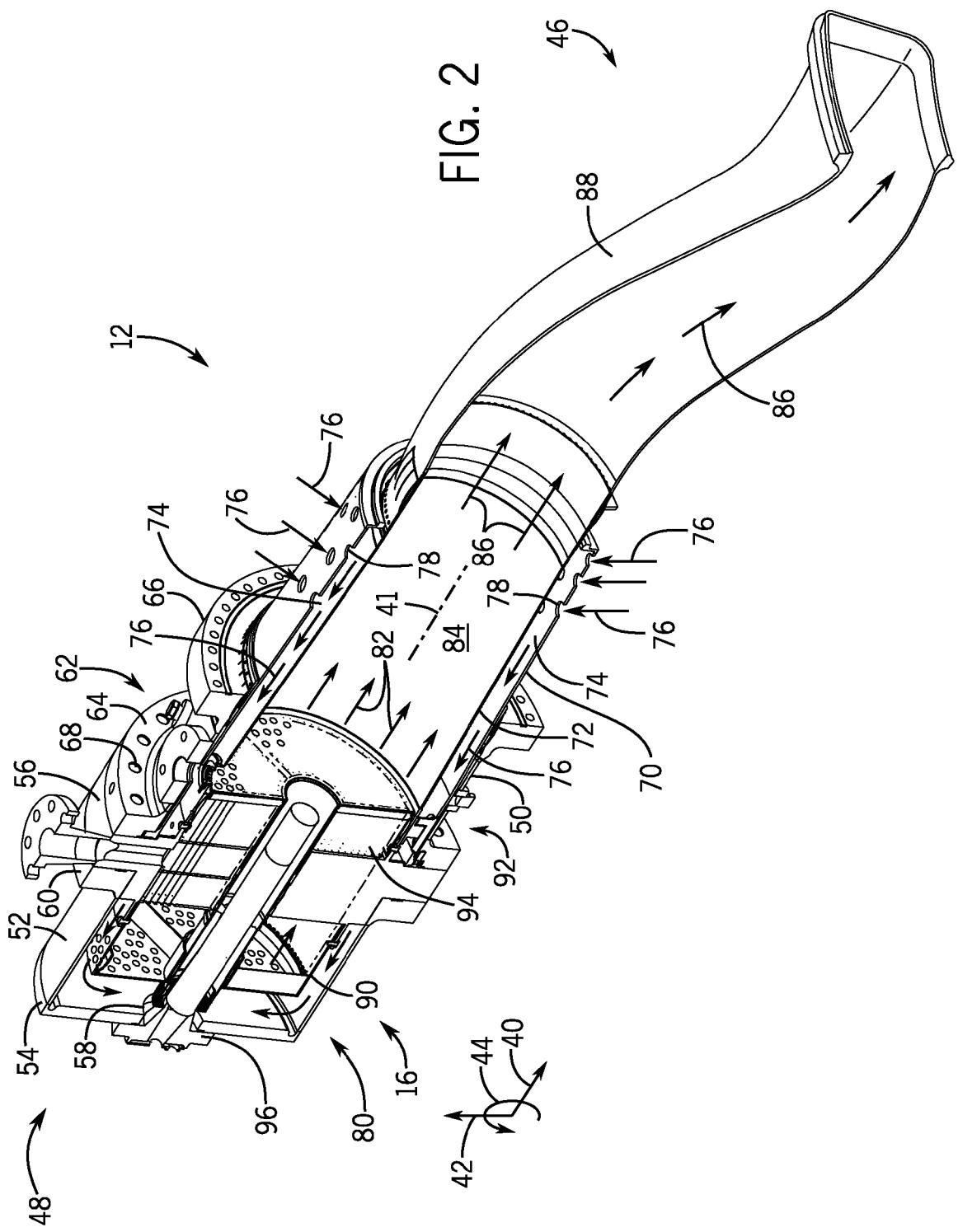
FIG. 2 is a cross-sectional perspective side view of a combustor with the micro mixer system of FIG. 1 according to an embodiment.

FIG. 2 is a cross-sectional perspective side view of a combustor 12 according to an embodiment. As shown in FIG. 2, an axial direction or axis 40 extends lengthwise along a central axis 41 of the combustor 12, a radial direction or axis 42 extends toward or away from the central axis 41 (e.g., perpendicular to the axis 40), and a circumferential direction 44 extends around the axial axis 40 and the central axis 41. The combustor 12 includes a downstream end 46 and an upstream end or head end 48. The downstream end 46 is located near the first stage of the turbine 18, whereas the upstream end 48 is opposite the downstream end 46 and located farther away from the first stage of the turbine 18. The combustor 12 includes multiple casings and walls that enclose the combustor 12 and contain the compressed air and fuel. Starting from the upstream end 48, the combustor 12 includes an end casing 52 coupled to an end plate 54. As illustrated, the end plate 54 maybe a simple end plate, which includes a single fuel nozzle aperture 58. However, in some embodiments, the end plate 58 will not include the fuel nozzle aperture 58. The endplate 54 may couple to the end casing 52 in a variety of ways including fasteners or welding. Opposite the end plate 54, the end casing 52 couples to the fuel nozzle housing 56. In order to couple to the fuel nozzle housing 56, the end casing 52 includes a flange 60, which enables attachment of the end casing 52 to the fuel nozzle housing 56. For example, the end casing 52 may couple to the fuel nozzle housing 56 with fasteners (e.g., threaded fasteners such as bolts) that extend through multiple apertures in the flange 60 and the fuel nozzle housing 56.

Continuing in direction 40, the combustor 12 includes an aft casing 62. The aft casing 62 includes a first flange 64 and a second flange 66. The first flange 64 enables the aft casing 62 to couple to the fuel nozzle housing 56. Specifically, the first flange 64 may include multiple apertures 68 that allow fasteners (e.g., threaded fasteners such as bolts) to couple the aft casing to the fuel nozzle housing 56. Opposite the first flange 64, the aft casing attaches or contacts a flow sleeve 70, which aids in cooling the components of the combustor 16. Continuing inward in the radial direction 42 is a combustion liner 72. It is the combustion liner 72 that contains the combustion reaction. An empty space is disposed between the flow sleeve 70 and the combustion liner 72, and may be referred to as an annulus 74. The liner 72 extends circumferentially 44 around the axis 41 of the combustor 12, the annulus 74 extends circumferentially 44 around the liner 72, and the flow sleeve 72 extends circumferentially 44 around the annulus 74. The annulus 74 directs airflow to the combustor upstream end 48. More specifically during operation, airflow 76 from the compressor 24 enters an air plenum that surrounds the flow sleeve 70. The flow sleeve 70 includes radial injection apertures 78 that enable the compressed airflow 76 to pass through the flow sleeve 70 and into the annulus 74. After the air 76 passes through the apertures 78, the annulus 74 channels the compressed air 76 towards the upstream end 48. In the upstream end 48, the compressed air 76 may be turned or redirected toward one or more fuel nozzles 80. The fuel nozzles 80 are configured to partially premix air and fuel to create a fuel air mixture 82. The fuel nozzles 80 discharge the fuel air mixture 82 into a combustion zone 84, where a combustion reaction takes place. The combustion reaction generates hot pressurized combustion products 86. These combustion products 86 then travel through a transition piece 88 to the turbine 18, thereby driving turbine blades to generate torque.

As explained above, the combustor includes a micro-mixer system 16. The micro-mixer system 16 includes the fuel nozzle housing 56, fuel nozzles 80, an inlet flow conditioner 90, and an aft plate assembly 92. As will be explained in more detail below, the micro-mixer system 16 functions to protect multi-tube fuel nozzles 80 from debris and thermal growth/gradients; and provides each of the micro-mixer tubes of the nozzles 80 with proper ratios of airflow and fuel, which reduces undesirable emissions. The micro-mixer system 16 may include multiple fuel nozzles 80, which include multi-tube fuel nozzles and/or other fuel nozzles (e.g., swirl vane nozzles). In the illustrated embodiment, the micro-mixer system 16 includes multi-tube fuel nozzles 94, supported by the fuel nozzle housing 56, and a center pilot fuel nozzle 96. The fuel nozzles 80 combine fuel and air to create a fuel air mixture for combustion in the combustion zone 84. The pilot nozzle 96, like the multi-tube fuel nozzles 94, combines fuel and air to create a fuel air mixture for combustion. However, the pilot nozzle 96 may help to anchor the combustion flame for the remaining fuel nozzles 94.

Figure 3:
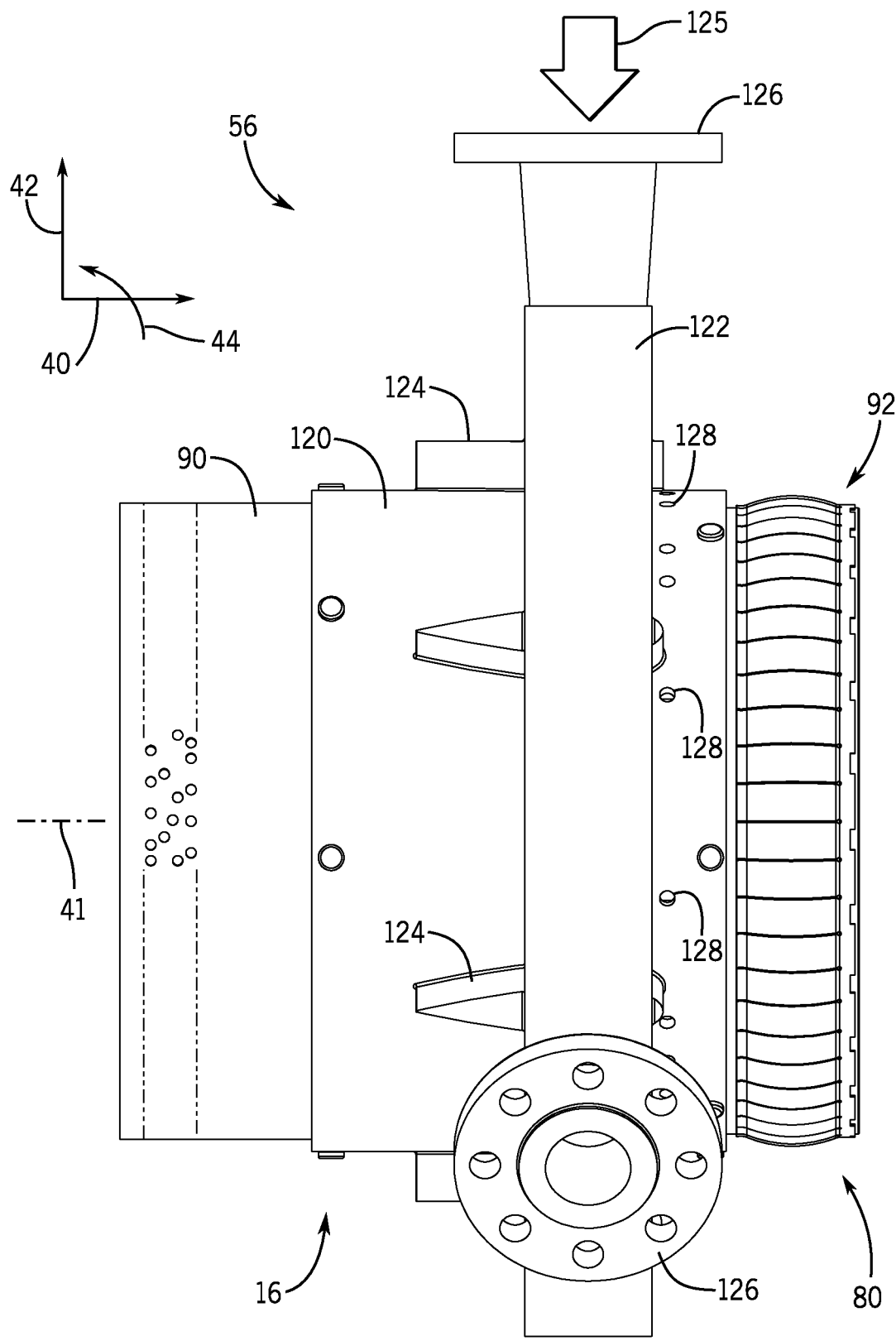
FIG. 3 is a side view of a micro-mixer system according to an embodiment.

FIG. 3 is a side view of a micro-mixer system 16 according to an embodiment. As explained above, the micro-mixer system 16 includes a fuel nozzle housing 56, an inlet flow conditioner 90, and an aft plate assembly 92. The fuel nozzle housing 56 radially supports the multi-tube fuel nozzles 80 (i.e., within the fuel nozzle housing 56) and provides a connection point for the inlet flow conditioner 90 and the aft plate assembly 92. In addition, the fuel nozzle housing 56 enables radial fuel delivery (i.e., in radial direction 42) to the fuel nozzles 80. The radial support and fuel delivery enables the combustor 12 to use a simple endplate 54 and increase the usable surface area for the multi-tube fuel nozzles 94.

The fuel nozzle housing 56 includes a first ring structure 120 (e.g., an outer wall) and a second ring structure or mounting structure 122 (e.g., an outer flange). As explained above, the fuel nozzle housing 56 couples to the end casing 52 and the aft casing 62. Specifically, second ring structure 122 couples to the end casing 52 and the aft casing 62, thus securing the micro-mixer system 16 within the combustor 12. The first ring structure 120 and the second ring structure 122 may be concentric with one another and coupled together with multiple struts 124 (e.g., radial support arms or airfoils). The struts 124 may be integral to the fuel nozzle housing 56. For example, the first ring structure 120, the second ring structure 122, and the struts 124 may be machined from stock, cast, or grown using an additive process. In other embodiments, the first ring structure 120, the second ring structure 122, and the struts 124 may be joined by welding, brazing, bolts, or other fasteners. As illustrated, the struts 124 may be aerodynamically shaped. For example, the struts 124 may have an airfoil shape or another type of aerodynamic shape. The aerodynamic shape enables the struts 124 to reduce an airflow wake as airflow passes in-between the first ring structure 120 and the second ring structure 122. A reduction in the wake reduces vibration and improves airflow into the inlet flow conditioner 90. The struts 124 may also enable radial fuel delivery to the fuel nozzles 94. Specifically, the struts 124 may include an aperture in fluid communication with apertures in the second ring structure 122 and the first ring structure 124. Accordingly, fuel is then able to flow from an external source 125, coupled to fuel flanges 126, through the fuel nozzle housing 56 and into the fuel nozzles 94 instead of through an end plate 54. The fuel nozzle housing 56 may also include cooling apertures 128. The cooling apertures 128 enable cooling airflow to flow into the fuel nozzle housing 56 (e.g., in radial direction 42) to cool the multi-tube fuel nozzles 94 and the aft plate assembly 92, thus extending the operating life multi-tube fuel nozzles 94 and the aft plate assembly 92.

Figure 4:
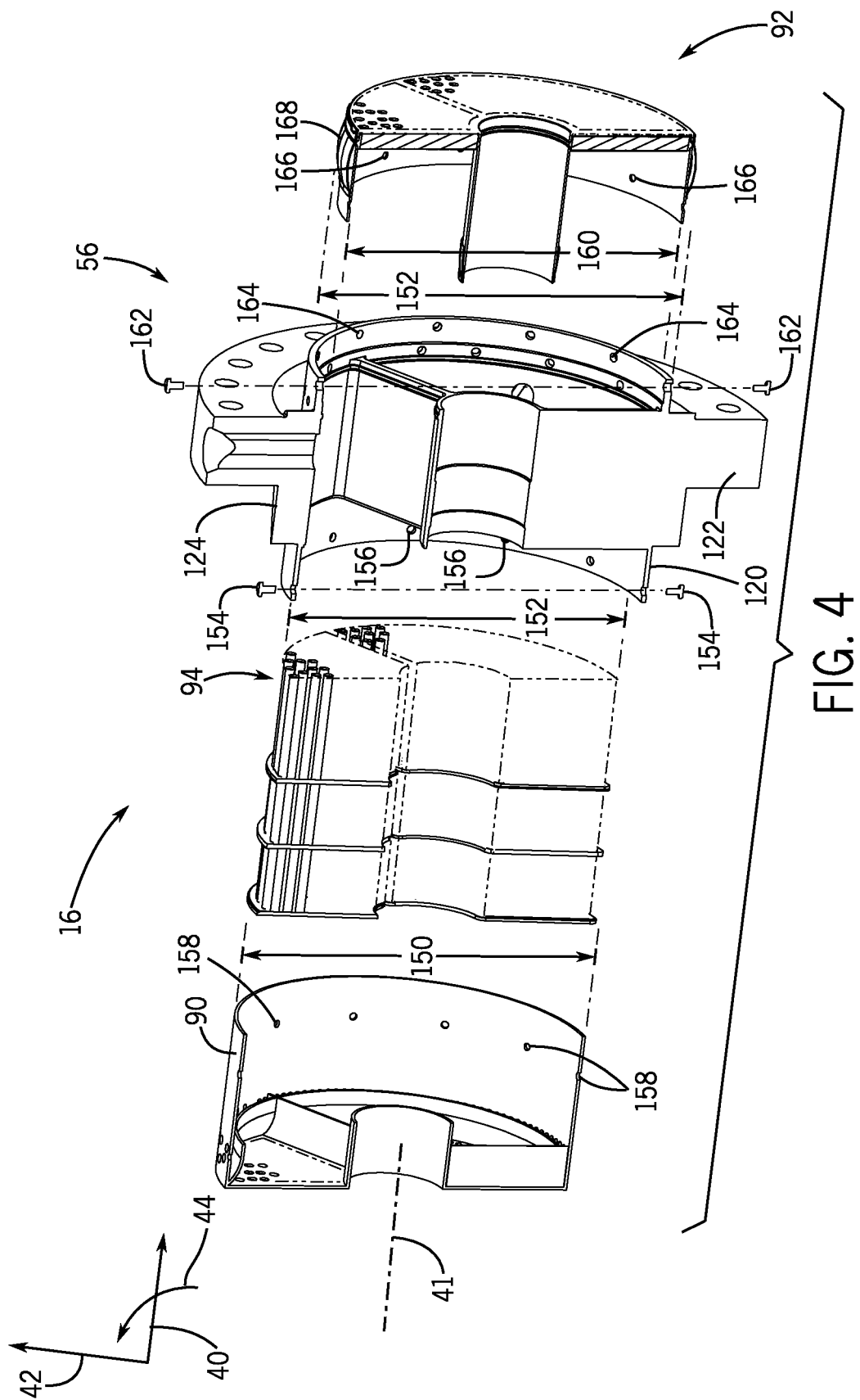
FIG. 4 is an exploded cross-sectional perspective view of a micro-mixer system according to an embodiment.

FIG. 4 is an exploded cross-sectional perspective view of a micro-mixer system 16. As illustrated, the micro-mixer system 16 may be a modular system facilitating attachment and detachment of components. Specifically, the micro-mixer system 16 may removably attach and detach the inlet flow conditioner 90 and the aft plate assembly 92 from the fuel nozzle housing 56. The ability to attach and detach the inlet flow conditioner 90 and the aft plate assembly 92 provides easy access to the fuel nozzles 94 for maintenance or replacement. Furthermore, increased modularity may result in a simpler assembly/disassembly procedures, time efficient maintenance procedures, smaller replacement jobs, and increased performance.

As illustrated, the inlet flow conditioner 90 extends circumferentially 44 about axis 41 and may have a generally annular wall with an outer diameter 150 that is smaller than an inner diameter 152 of the first ring structure 120. The difference in diameters enables the inlet flow conditioner 90 to slide axially 40 into the first ring structure 120. The inlet flow conditioner 90 is then able to attach or mount with a first mount 153. The first mount 153 may include the first ring structure 120, multiple fasteners 154, apertures 156 in the first ring structure 120, and apertures 158 in the inlet flow conditioner 90. The fasteners 154 couples the inlet flow conditioner 90 to the first ring structure 120 through apertures 156 in the first ring structure 120 and the corresponding apertures 158 in the inlet flow conditioner 90. The fasteners 154 may be bolts, rivets, pins, or other removable fasteners. Alternatively, the inlet flow conditioner 90 may couple to the first ring structure 120 through brazing, welding, or even welding/brazing in combination with bolts or rivets. In still other embodiments, the diameter 150 of the inlet flow conditioner 90 may be greater than the diameter 152 of the first ring structure 120, enabling the inlet flow conditioner 90 to slide axially 40 over and couple to the exterior of the first ring structure 120.

The aft plate assembly 92 extends circumferentially 44 about axis 41 and may have a generally annular wall that may couple to the fuel nozzle housing 56. The aft plate assembly 92 may define an outer diameter 160 that is smaller than the inner diameter 152 of the first ring structure 120. The difference in diameters enables the aft plate assembly 92 to slide axially 40 into the first ring structure 120. The aft plate assembly 92 attaches or mounts to the fuel nozzle housing 56 with a second mount 161. The second mount 161 may include the first ring structure 120, multiple fasteners 162, apertures 164, and apertures 166 in the aft plate assembly 92. The fasteners 162 couple the aft plate assembly 92 to the first ring structure 120 through apertures 164 in the first ring structure 120 and corresponding apertures 166 in the aft plate assembly 92. The fasteners 162 may be bolts, rivets, pins, or other removable fasteners. Alternatively, the aft plate assembly 92 may couple to the first ring structure 120 through brazing, welding, or welding/brazing the rivets or bolts in place. To control cooling air from passing between the aft plate assembly 92 and the first ring structure 120, the micro-mixer system 16 may include a seal 168 (e.g., a hoop seal) between the aft plate assembly 92 and the first ring structure 120. In still other embodiments, the outer diameter 160 of the aft plate assembly 92 may be greater than the diameter 152 of the first ring structure 120, enabling the aft plate assembly 92 to slide axially 40 over and couple to the exterior of the first ring structure 120.

Figure 5:
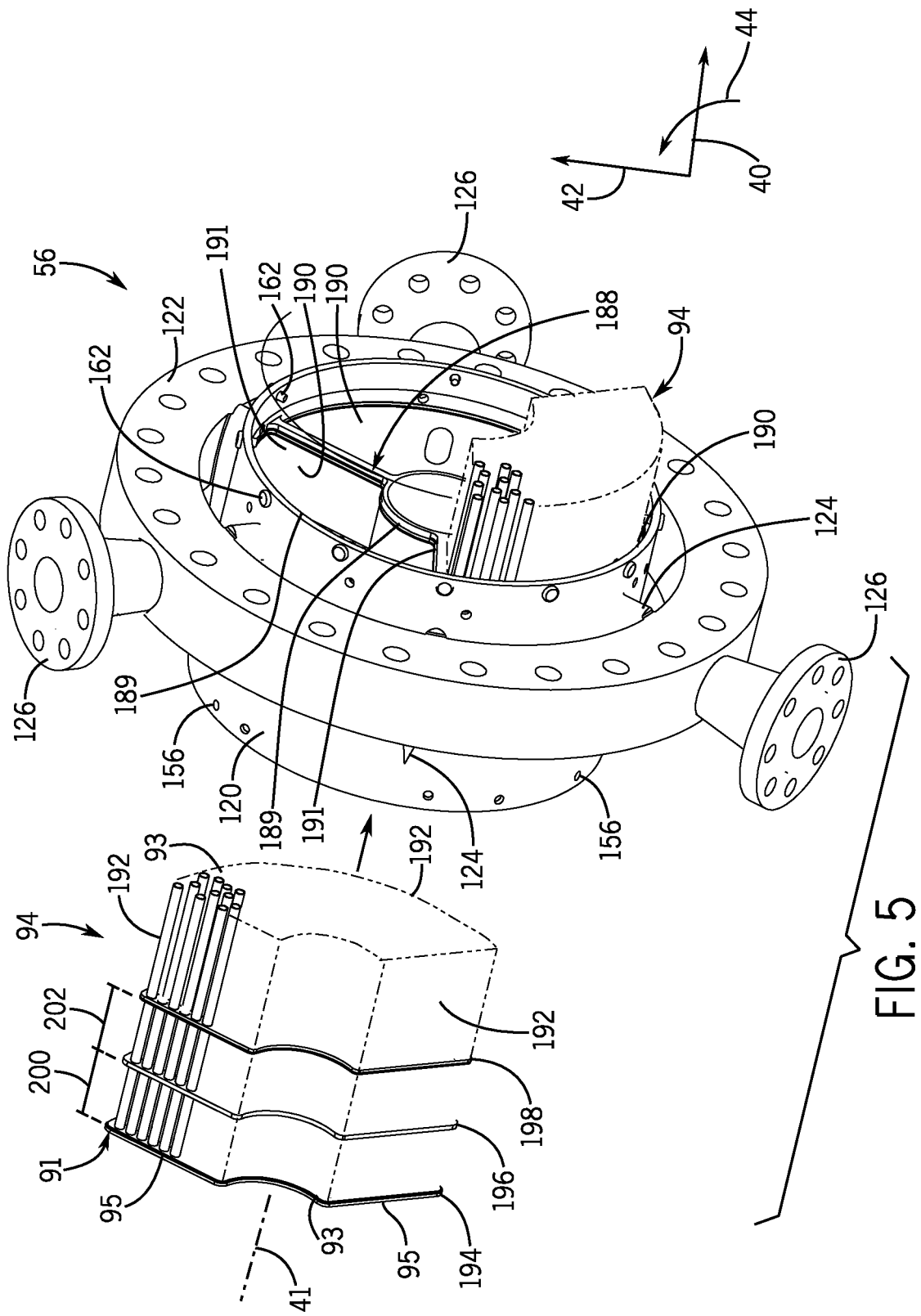
FIG. 5 is an exploded perspective view of a fuel nozzle housing and multi-tube fuel nozzles according to an embodiment.

FIG. 5 is a perspective front end view of an embodiment of the fuel nozzle housing 56, illustrating fuel nozzles 94 (e.g., multi-tube fuel nozzles). Specifically, FIG. 5 illustrates fuel nozzles 94 in varying stages of assembly in fuel nozzle receptacles 190 of the fuel nozzle housing 56. For example, in the illustrated embodiment, one of the fuel nozzles 94 is fully installed in a fuel nozzle receptacle 190, while a second fuel nozzle 94 is ready to be inserted into a neighboring fuel nozzle receptacle 190. The remaining fuel nozzle receptacle 190 is empty (i.e., without an installed third fuel nozzle 94) for purposes of illustration. In the illustrated embodiment, each fuel nozzle receptacle 190 has a truncated-pie shaped perimeter 188, which may be defined by opposite curved sides 189 and opposite converging sides 191. Furthermore, the illustrated fuel nozzle housing 56 has three equally sized fuel nozzle receptacles 190, each having the truncated-pie shaped perimeter 188. In other embodiments, the fuel nozzle housing 56 may have 2, 3, 4, 5, 6, 7, 8, 9, 10, or more fuel nozzle receptacles 190 with truncated-pie shaped perimeters 188. However, each fuel nozzle receptacle 190 may resemble any shape, such as circles, rectangles, triangles, pie-shapes, or any other suitable geometry.

The illustrated fuel nozzles 94 have a truncated-pie shaped perimeter 91, which may be defined by opposite curved sides 93 and opposite converging sides 95. The truncated-pie shaped perimeter 91 is contoured or shaped to fit into the truncated-pie shaped perimeter 188 of the receptacle 190. The fuel nozzles 94 include multiple micro-mixer tubes 192 (e.g., mixing tubes) arranged within plates 194, 196, and 198. In certain embodiments, the multi-tube fuel nozzle 94 may include 5 to 1000, 10 to 500, 20 to 250, or 30 to 100 tubes 192, which are generally parallel with one another along the axis 41. Each tube 192 may be approximately 0.25 to 5, 0.5 to 3, or 1 to 2 centimeters in diameter. The plates 194, 196, and 198 are axially offset from one another by distances 200 and 202 to form chambers with fuel nozzle housing 56. In the present embodiment, there are three support plates, but in other embodiments there may two or more support plates (e.g., 2, 3, 4, 5, 6, etc.). In this manner, the plates 194, 196, and 198 support, space, and arrange the micro-mixer tubes 192 in a designated pattern. In the illustrated embodiment, the tubes 192 are exposed along the sides 93 and 95 of each fuel nozzle 94. In other words, each fuel nozzle 94 does not include its own dedicated housing, but rather the fuel nozzle housing 56 serves as a common or shared housing for the plurality of fuel nozzles 94. As a result, each fuel nozzle 94 may be described as a bundle of tubes 192, which can be axially 40 inserted and removed from a respective receptacle 190 in the housing 56.

Figure 6:
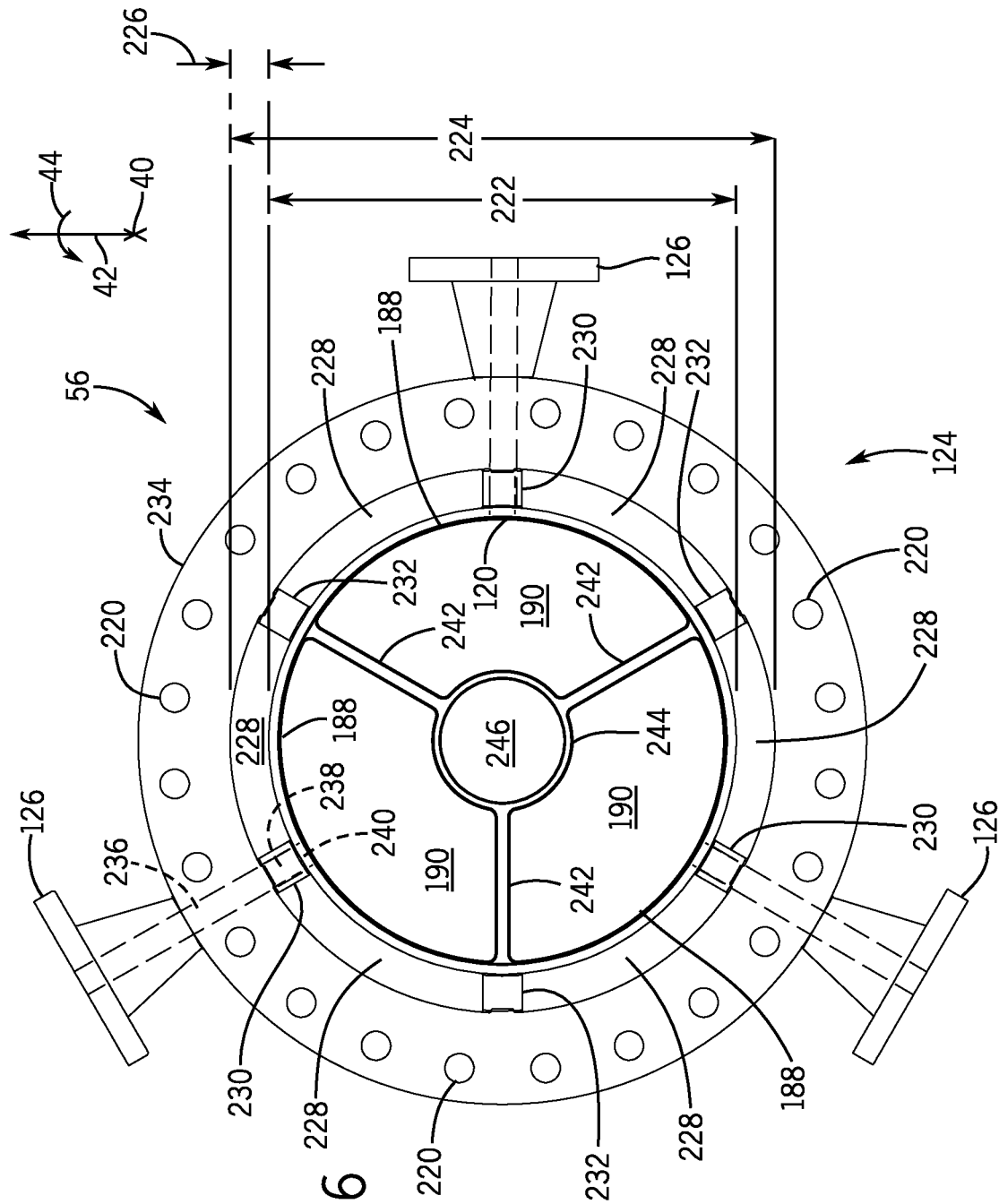
FIG. 6 is a front view of a fuel nozzle housing according to an embodiment.

FIG. 6 is a front view of the fuel nozzle housing 56 configured to support multiple fuel nozzles 80 (e.g., multi-tube fuel nozzles 94, central fuel nozzle 96, etc.) and provides a connection point for the inlet flow conditioner 90 and the aft plate assembly 92. As explained above, the fuel nozzle housing 56 includes the first ring structure 120 and the second ring structure 122. In order to couple the fuel nozzle housing 56 to the neighboring combustor casings, the second ring structure 122 includes a plurality of apertures 220. The apertures 220 may receive fasteners (e.g., threaded fasteners or bolts) that enable the fuel nozzle housing 56 to couple to flanges on the combustor end casing 52 and the combustor aft casing 62. The first ring structure 120 and the second ring structure 122 may be concentric with one another about the axis 41. As illustrated, the first ring structure 120 defines an outer diameter 222 smaller than the inner diameter 224 of the second ring structure 122. The difference in the diameters 226 forms airflow passages 228 between the first ring structure 120 and the second ring structure 122. The airflow passages 228 enable air to flow through the fuel nozzle housing 56 in an upstream direction toward the endplate 54.

The airflow passages 228 are separated by struts 124 that couple the first ring structure 120 to the second ring structure 122. In the illustrated embodiment, the fuel nozzle housing 56 may include two kinds of struts: (1) fuel carrying struts 230; and (2) struts 232 that do not carry fuel. The struts 124 may also be integral to the fuel nozzle housing 56 and configured to reduce resonant vibration in the fuel nozzle housing 56. For example, the struts 124 may be aerodynamically shaped to reduce the wake from the airflow through the airflow passages 228. In addition, the struts 124 may provide the appropriate amount of stiffness to tune out resonant frequency vibrations or change the resonance frequency of the fuel nozzle housing 56. For example, in the present embodiment the fuel nozzle housing 56 includes three fuel struts 230 and three support struts or structural struts 232. In other embodiments, the fuel nozzle housing 56 may include more fuel struts 230 (e.g., 1, 2, 3, 4, 5, 6, 7, 8, 9, 10, or more), or more support struts 232 (e.g., 1, 2, 3, 4, 5, 6, 7, 8, 9, 10, or more). In other embodiments, some or all of the struts 124 may be larger and/or stiffer to tune resonant vibration or provide additional support at specific locations within the fuel nozzle housing 56.

As explained above, the fuel nozzle housing 56 enables radial fuel 42 delivery to the fuel nozzles 80. The fuel nozzle housing 56 receives fuel through fuel flanges 126 that couple to an exterior surface 234 of the second ring structure 122. As fuel passes through the fuel flange 126 it enters an aperture 236 in the second ring structure 122. After passing through the aperture 236, the fuel enters the fuel strut 230, which includes an aperture 238 leading to an aperture 240 in the first ring structure 120. As the fuel passes through the second ring structure 120, the fuel enters the fuel nozzle receptacle 190 for use by the fuel nozzles 80. As explained above, the radial support and fuel delivery through the fuel nozzle housing 56 enables simplification of the endplate 54, and increases the usable surface area for the multi-tube fuel nozzles 94 (e.g., the number and/or size of the micro-mixer tubes 192) within the first ring structure 120.

In the present embodiment, there are three fuel nozzle receptacles 190 separated by radial divider walls or plates 242. However, there may be any number of fuel nozzle receptacles 190 (e.g., 1, 2, 3, 4, 5, 6, or more). As illustrated, the non-fuel struts 232 align with the plates 242 with the fuel struts 230 centrally positioned between the walls 242. However, in other embodiments, the fuel struts 230 and non-fuel struts 232 may be positioned elsewhere. The radial divider walls or plates 242 couple to the first ring structure 120 and to a third ring structure 244 (e.g., a first inner wall). The third ring structure 244 may be concentric with the first ring structure 120 and the second ring structure 122; and defines a central receptacle 246. The central receptacle 246 may be configured to receive a central fuel nozzle or pilot nozzle 96 that may help to anchor the combustion reaction of the surrounding multi-tube fuel nozzles 94. However, in other embodiments, the central receptacle 246 may be configured to receive a round multi-tube fuel nozzle. Moreover, other embodiments may have a larger, smaller or no central receptacle 246. In the illustrated embodiment, the fuel nozzle receptacles 190 have a truncated-pie shaped perimeter 188, and the central receptacle 246 is circular. However, the fuel nozzle receptacles 190 and central receptacle 246 may resemble any shape, such as, circles, rectangles, triangles, pie-shapes, or any other suitable geometry. As explained above, the fuel nozzle housing 56 (i.e., the first ring structure 120, the third ring structure 244, and radial divider wall 242) beneficially provides a housing for the multi-tube fuel nozzles 94. Accordingly, each fuel nozzle 80 does not require its own independent housing, and thus can be replaced at a lower cost.

Figure 7:
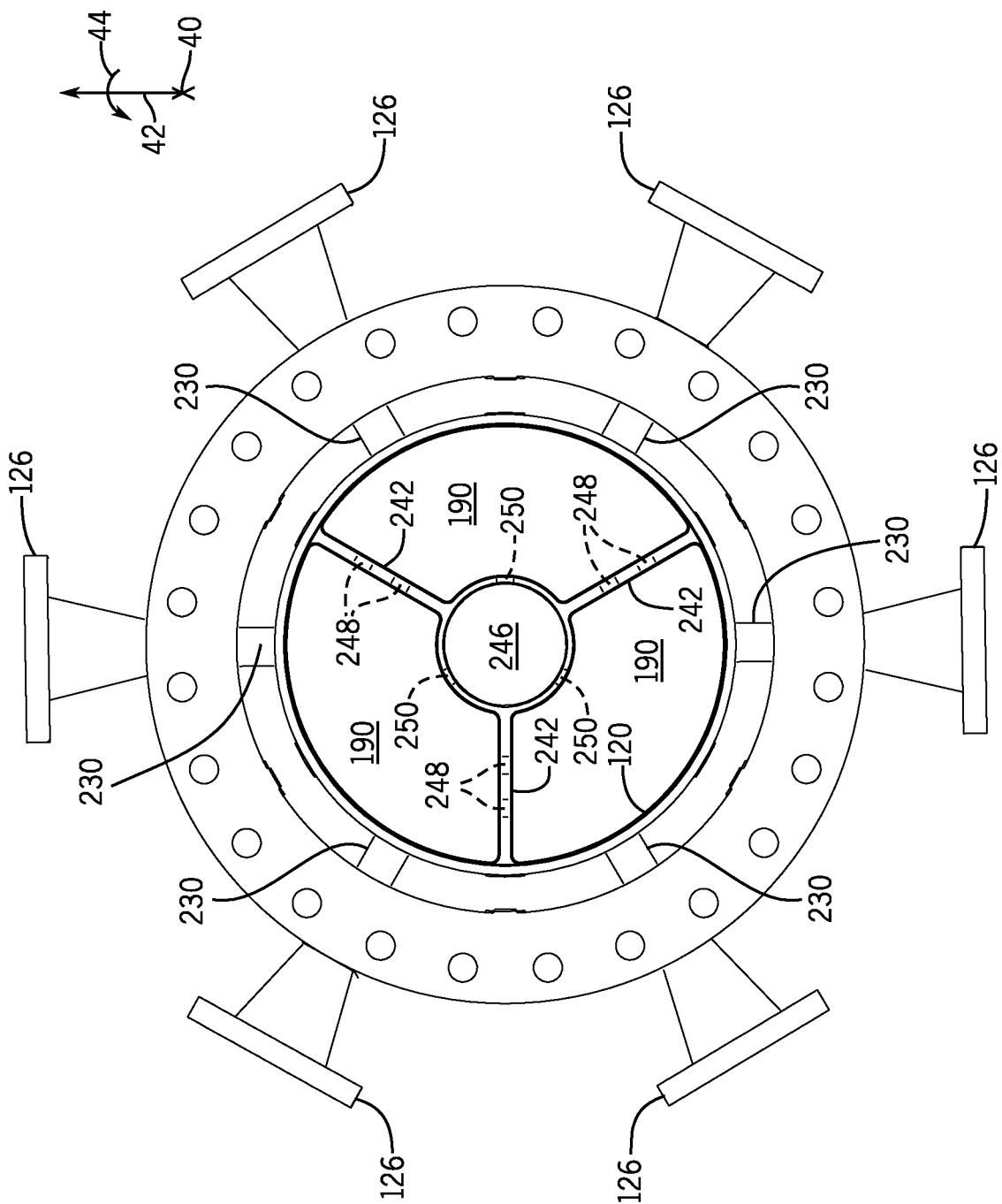
FIG. 7 is a front view of a fuel nozzle housing according to an embodiment.

FIG. 7 is a front view of a fuel nozzle housing 56 according to an embodiment. As illustrated, the fuel nozzle housing 56 radially couples to six fuel flanges 126. The fuel nozzle housing 56 receives fuel from the fuel flanges 126 and delivers the fuel radially 42 to the fuel nozzle receptacles 190, for use by the fuel nozzles 80. As explained above, the fuel passes through apertures in the second ring structure 122, the fuel struts 230, and the first ring structure 120 before entering the fuel nozzle receptacles 190. In the illustrated embodiment, each fuel nozzle receptacle 190 is fed by two fuel flanges 126. The two fuel flanges 126 carry the fuel from the second ring structure 122 to the first ring structure 120 through two corresponding fuel struts 230. In other embodiments, there may additional fuel flanges 126 for each of the fuel nozzle receptacles (e.g., 1, 2, 3, 4, 5, or more fuel flanges 126) that deliver fuel through a corresponding number of fuel struts 230 (e.g., 1, 2, 3, 4, 5, or more fuel struts 230).

As further illustrated in FIG. 7, the radial plates 242 may include apertures 248 that enable fuel to flow from one fuel nozzle receptacle 190 to a neighboring fuel nozzle receptacle 190. For example, the apertures 248 may be distributed throughout the plates 242 to help distribute the fuel more evenly among the tubes 192 of the fuel nozzles 94. By further example, the number (e.g., 1 to 1000), size (e.g., diameter), shape (e.g., circular, oval, triangular, square, hexagonal, etc.), axial 40 position, and radial 42 position of the apertures 248 may be varied to control the distribution of fuel among the receptacles 190, and thus among the multiple tubes 192 of the fuel nozzles 94. In some embodiments, each of the plates 242 may include no apertures 248, more apertures 248 (e.g., 0, 1, 2, 3, 4, 5, 10, 15, 20, 25 or more apertures 248), or differ in the number of apertures 248 between plates 242. For example, one of the plates 242 may include two apertures 248, while the remaining plates have five and ten apertures 248 respectively. In an embodiment with apertures 248 in the plates 242, there may be fewer fuel flanges 126 and fuel struts 230, because fuel may flow freely between the fuel nozzle receptacles 190. Accordingly, a single fuel flange 126 and fuel strut 230 may supply all the fuel to the fuel nozzle receptacles 190. Furthermore, FIG. 7 illustrates that the third ring structure 244 may include apertures 250. The apertures 250 permit fuel in the fuel nozzle receptacles 190 to enter the central receptacle 246. In the present embodiment, there are three apertures 250, however, in different embodiments there may be different numbers of apertures 250 (e.g., 0, 1, 2, 3, 4, 5, 10, 15, or more apertures 250). In still other embodiments, the third ring structure 244 may include apertures 250 that communicate only with some of the fuel nozzle receptacles 190. For example, the third ring structure 244 may only include apertures 250 between the central receptacle 246 and one of the fuel nozzle receptacles 190.

Figure 8:
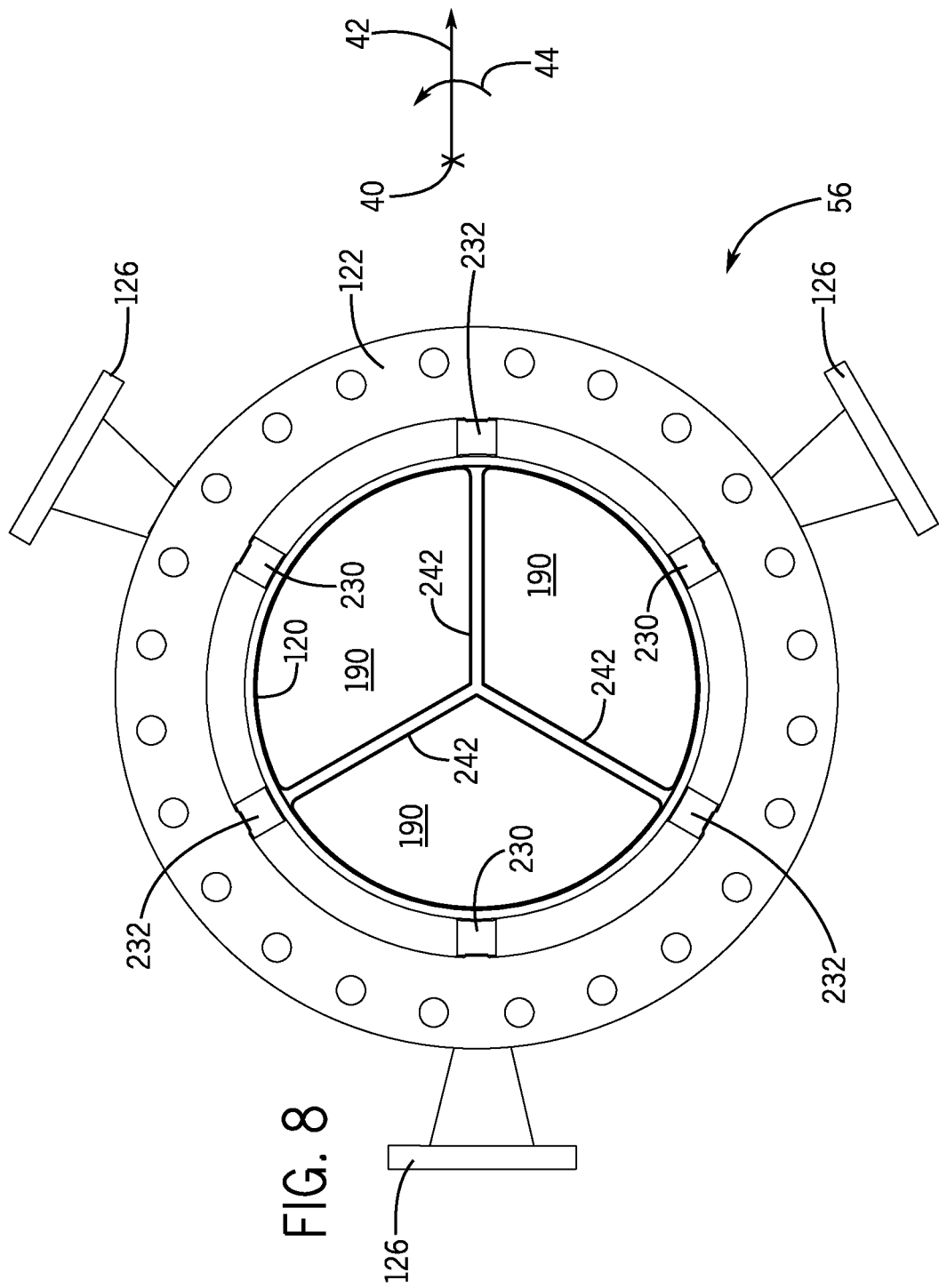
FIG. 8 is a front view of a fuel nozzle housing according to an embodiment.

FIG. 8 is a front view of a fuel nozzle housing 56 according to an embodiment. In the illustrated embodiment, the fuel nozzle housing 56 includes three fuel nozzle receptacles 190. Each of these fuel nozzle receptacles 190 occupies approximately 120 degrees of the area within the first ring structure 120. Indeed, FIG. 8 illustrates an embodiment without a central receptacle, which was shown in previous figures. While FIG. 8 illustrates only three fuel nozzle receptacles 190, other embodiments may include different amounts of fuel nozzle receptacles 190 (e.g., 1, 2, 3, 4, 5, 6, 7, 8, 9, 10 or more fuel nozzle receptacles 190) separated by plates 242. Furthermore, each of these fuel nozzle receptacles 190 may occupy equal or different amounts of area within the first ring structure. For example, one fuel nozzle receptacle 190 may occupy 180 degrees of the first ring structure 120, while the remaining fuel nozzle receptacles 190 occupy a respective 90 degrees.

Figure 9:
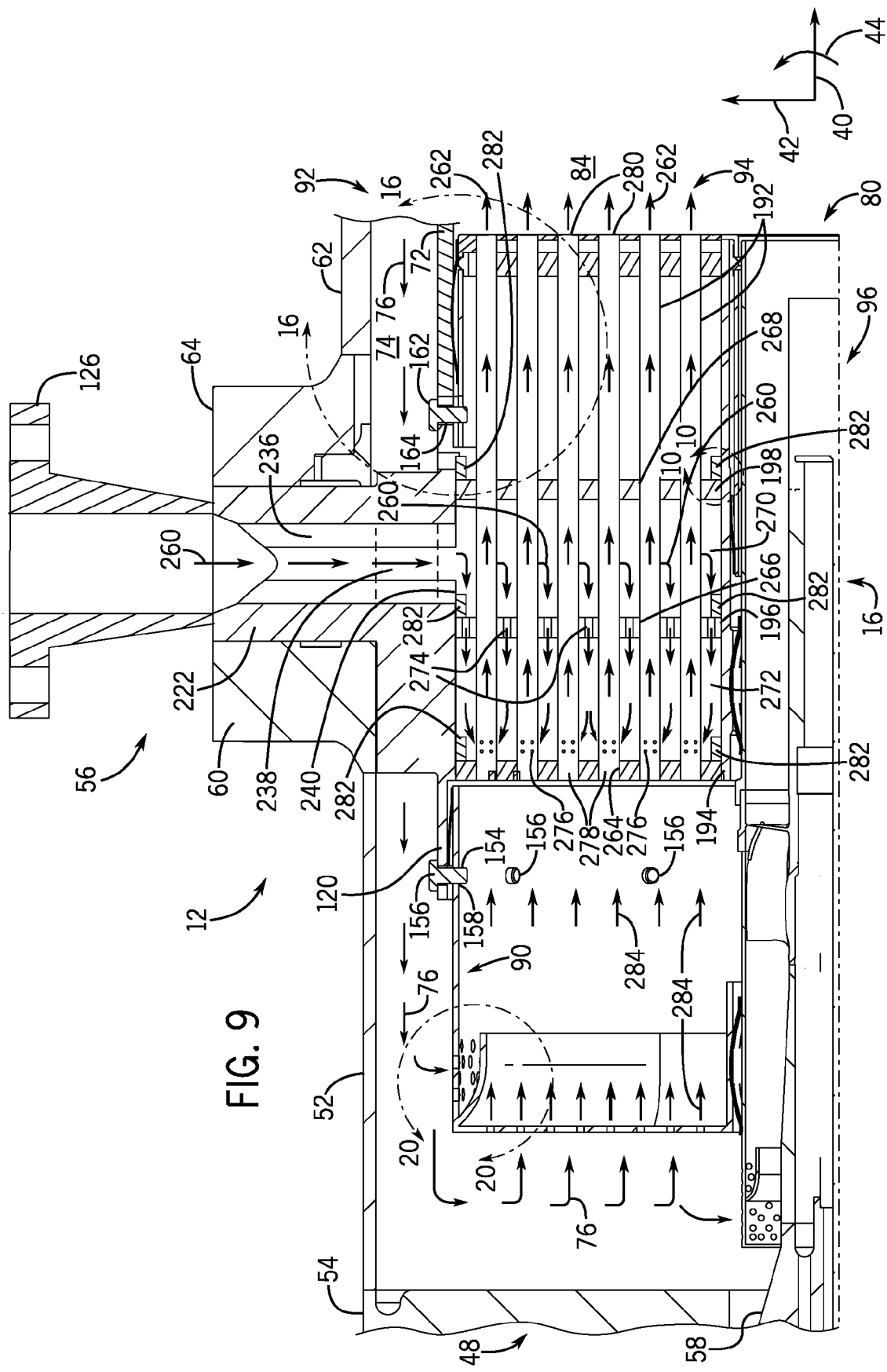
FIG. 9 is a partial cross-sectional view of a micro-mixer system according to an embodiment.

FIG. 9 is partial cross-sectional view of a micro-mixer system 16 according to an embodiment. As explained above, micro-mixer system 16 includes the fuel nozzle housing 56, fuel nozzles 80, the inlet flow conditioner 90, and the aft plate assembly 92. The fuel nozzle housing 56 radially supports the micro-mixer system 16 by coupling between the end casing 52 and the aft casing 62, or more specifically, by coupling to the flange 60 of the end casing 52 and the first flange 64 of the aft casing 62. With the fuel nozzle housing 56 coupled between the end casing 52 and the aft casing 62, the fuel nozzle housing 56 is able to radially support and radially supply fuel to the fuel nozzles 80. The fuel nozzles 80 may be multi-tube fuel nozzles 94 or multi-tube fuel nozzles 94 in combination with a pilot fuel nozzle 96. In the illustrated embodiment, the fuel nozzle housing 56 supports multi-tube fuel nozzles 94 and a center pilot fuel nozzle 96.

In operation, the fuel nozzles 80 (e.g., multi-tube fuel nozzles 94 and the pilot fuel nozzle 96) combine fuel and air to create a fuel air mixture for combustion in the combustion zone 84. The fuel nozzles 80 receive airflow from the compressor 24. As explained above, the compressor 24 discharges airflow into an air plenum that surrounds the downstream end 46 of the combustor 12. The radial injection apertures 78 in the flow sleeve 70 enable airflow 76 to pass through the flow sleeve 70 and enter the annulus 74. The annulus 74 formed by the flow sleeve 70 and the combustion liner 72 guide the airflow towards the upstream end 48 of the combustor 16. In the upstream end 48, the airflow 76 enters the inlet flow conditioner 90. As will be explained in more detail below, the inlet flow conditioner 90 is configured to help distribute the airflow circumferentially 44 about the fuel nozzles 94, thereby helping to provide a more equal amount of airflow into each tube 192 of the fuel nozzles 94. In addition, the inlet flow conditioner 90 may function as a filter to help block passage of particulate matter into the receptacles 190, thereby helping to reduce clogging of the tubes 192. After passing through the inlet flow conditioner 90 the compressed air enters the tubes 192 of the multi-tube fuel nozzle 94. The tubes 192 combine the compressed air with fuel 260 to create a fuel air mixture 262 that combusts in the combustion zone 84. The fuel 260 radially enters the fuel nozzle housing 56 through the fuel flange 126. The fuel 260 then passes through the second ring structure 122, the fuel strut 230, and the first ring structure 120 through the respective apertures 236, 238, and 240. As the fuel 260 passes through the first ring structure 120, the fuel 260 enters the fuel nozzle receptacle 190 for use by the fuel nozzles 94. As explained above, the radial support and fuel delivery through the fuel nozzle housing 56 enables simplification of the endplate 54, and increases the usable surface area for the multi-tube fuel nozzles 94 (e.g., the number and/or size of the micro-mixer tubes 192).

The multi-tube fuel nozzle 94 includes multiple tubes 192 extending through tube apertures 264, 266, and 268 in the respective plates 194, 196, and 198. In the illustrated embodiment, the multi-tube fuel nozzle 94 includes three plates 194, 196, and 198, which are axially offset from one another to define chambers 270 and 272. As fuel 260 enters the multi-tube fuel nozzle 94, the fuel 260 first enters the chamber 270. Fuel 260 is distributed throughout chamber 270 before flowing downstream into chamber 272. The chamber 270 also helps to balance the pressure and flow of the fuel around all of the tubes 192. As illustrated, the plate 196 includes apertures 274 that allow fuel to exit the chamber 270 and enter the chamber 272. In some embodiments, the tube apertures 266 may form sufficient space for fuel to flow around the tubes 92 from chamber 270 into the chamber 272. In still other embodiments, the tube apertures 266 and apertures 274 may enable fuel 260 to flow from the chamber 270 into the chamber 272. The apertures 266 and/or 274 are configured to help distribute the fuel more uniformly into the chamber 272, which then further balances the pressure and flow of fuel prior to entry into the tubes 192. In the chamber 272, the fuel 260 enters the tubes 192 through fuel inlets or slots 276 (e.g., 1 to 100 fuel inlets). As the fuel 260 passes through the fuel inlets 276, the fuel 260 mixes with air 76 passing through air inlets 278. The fuel air mixture 262 then travels through the tubes 192 before exiting through outlets 280. In the illustrated embodiment, the fuel inlets 276 are within the chamber 272. However, in other embodiments, the fuel inlets 276 maybe in the chamber 270 or in both chamber 270 and 272. In still other embodiments, the fuel nozzle 94 may exclude the plate 196, and the fuel inlets 276 may be located between the plate 194 and the plate 198.

As explained above, the multi-tube fuel nozzle 94 may include the plates 194, 196, and 198. The plates 194, 196, and 198 may be fixed or movable relative to the tubes 192, the fuel nozzle housing 56, and/or other support structures of the combustor 16. For example, plates 194, 196, and 198 may have a fixed connection with the tubes 192 formed by welding, brazing, bolting, and/or creating an interference fit. By further example, a movable connection 282 (e.g., a resilient metallic seal) may be positioned between one or more of the plates 194, 196, and 198 and the fuel nozzle housing 56. The movable connection 282 enables one or more plates 194, 196, and 198 to move in the axial direction 40 in response to thermal expansion and contraction of the tubes 192. In the illustrated embodiment, the plates 194, 196, and 198 have fixed connections with the tubes 52, but plates 194 and 198 have movable connections 282 (e.g., the resilient metallic seal) with the fuel nozzle housing 56. In another embodiment, the plate 194 may have a fixed connection with the fuel nozzle housing 56 and the tubes 192, while the plates 196 and 198 have a movable connection 282 with the fuel nozzle housing 56. In another embodiment, the plate 198 may have a fixed connection with the tubes 192 and a movable connection 282 (e.g., the resilient metallic seal) with the fuel nozzle housing 56, while the plates 194 and 196 have fixed connections with the fuel nozzle housing 56 and movable connections (e.g., sliding joints) with the tubes 192. In another embodiment, the plate 196 has a fixed connection with the tubes 192 and a movable connection (e.g., the resilient metallic seal) with the fuel nozzle housing 56, while the plates 194 and 198 have fixed connections with the fuel nozzle housing 56 and movable connections (e.g., sliding joints) with the tubes 192. In still another embodiment, each one of the plates 194, 196, and 198 may have a fixed connection with the tubes 192 and a movable connection (e.g., the resilient metallic seal) with the fuel nozzle housing 56. In each of these embodiments, the movable connections 282 (e.g., the resilient metallic seals) are configured to expand and contract in response to thermal expansion or thermal contraction of the tubes 192, the fuel nozzle housing 56, or any other structure of the combustor 16, thereby reducing thermally induced stresses while maintaining a fluid-tight seal.

During operation of the system 10, each tube 192 of the multi-tube fuel nozzle 94 receives approximately equal amounts of airflow through the inlet flow conditioner 90 and fuel 260 through the fuel inlets 276 within the chamber 272. The fuel and air mixes within each tube 192, and then discharges as the fuel-air mixture 262 through the fuel-air mixture outlet 280 for combustion within the combustor 16. As appreciated, the temperature near the outlets 280 is elevated due to combustion within the combustor 16. Furthermore, the temperature of the airflow 284 may be substantially greater than the temperature of the fuel flow 260. For example, the temperature of the airflow 284 may be approximately 250 to 500 degrees Celsius, while the temperature of the fuel flow 260 may be approximately 20 to 250 degrees Celsius. As a result of these temperature gradients, the material composition of the parts (e.g., tubes 192, fuel nozzle housing 56, etc.), and other factors, the tubes 192 may undergo a thermal expansion during operation of the micro-mixer system 16. The movable connections 282 (e.g., resilient metallic seals) are configured to absorb this thermal expansion (and any thermal contraction, e.g., during shutdown) to protect the various parts of the multi-tube fuel nozzles 94 and combustor 16. Without the movable connections 282 (e.g., resilient metallic seals), the tubes 192, fuel nozzle housing 56, and other support structures may be subjected to significant thermal stresses, which may cause premature wear, stress cracks, and reduced life of the multi-tube fuel nozzles 94. Accordingly, the movable connections 282 (e.g., resilient metallic seals) may help to improve the operability, performance, and life (e.g., reduced stress and fatigue) of the multi-tube fuel nozzles 94. For example, the movable connections 282 may enable the multi-tube fuel nozzles 94 to withstand much greater temperature differentials, thereby allowing performance enhancements without damaging the multi-tube fuel nozzle 94 or micro-mixer system 16. As discussed in further detail below, the movable connection 282 maintains a working seal between the fuel nozzle housing 56 and the plates 194 and 198, while also enabling axial movement due to the thermal expansion or contraction of the tubes 192.

Figure 10:
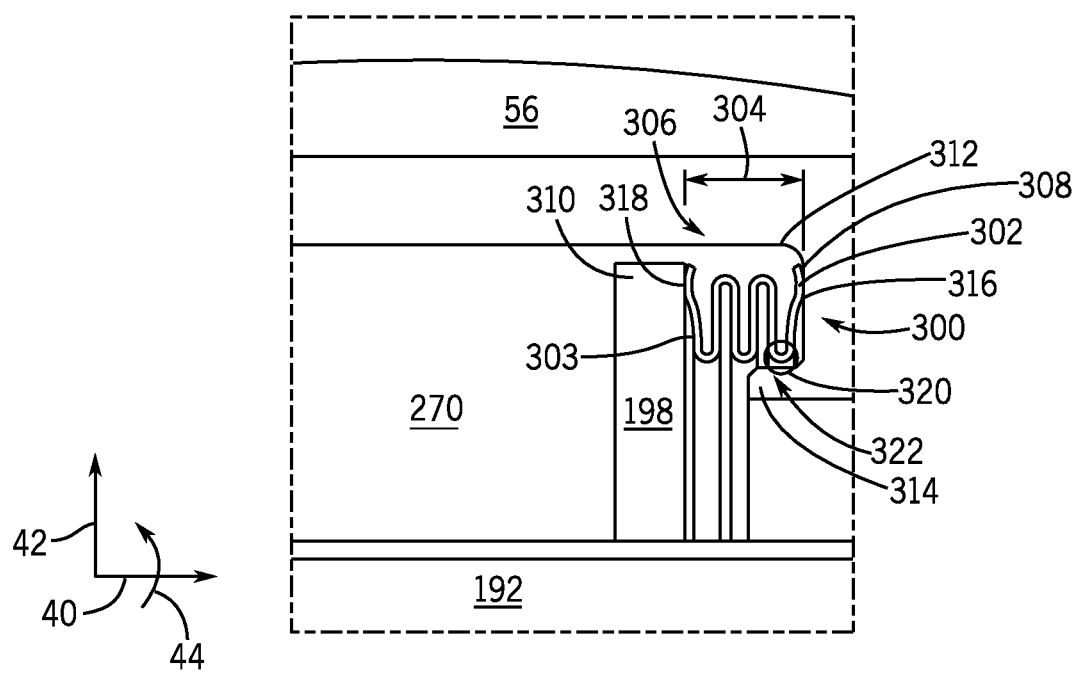
FIG. 10 is a sectional view of the micro-mixer system of FIG. 9 along line 10-10, illustrating an embodiment of a resilient metallic seal.

FIG. 10 is a sectional view of the micro-mixer system 16 of FIG. 9, taken within line 10-10 illustrating an embodiment of a resilient metallic seal 300 (e.g., metallic bellows 302). As discussed below, the metallic bellows 302 has a wall 303 with one or more bends or turns, which can expand and contract in the axial direction 304. As illustrated in FIG. 10, the resilient metallic seal 300 (e.g., metallic bellows 302) extends between the fuel nozzle housing 56 and the plate 198, thereby forming a working seal between the fuel nozzle housing 56 and the plate 198. The plate 198 is fixed to the tubes 192, and thus the plate 198 and tubes 192 move together in response to thermal expansion and contraction while the resilient metallic seal 300 (e.g., metallic bellows 302) expands and contracts in the axial direction 304. In the illustrated embodiment, the resilient metallic seal 300 is disposed between the fuel nozzle housing 56 and the plate 198 in a pocket 306 (e.g., an annular pocket or sector shaped pocket), which may be formed by a groove 308 (e.g., annular grove or sector shaped groove) in the fuel nozzle housing 56 opposite from a peripheral portion 310 of the plate 198. The groove 308 may be disposed between an inner surface 312 of the second ring structure 120 and an inner protrusion or lip portion 314 (e.g., annular lip or sector shaped lip) of the fuel nozzle housing 56. The pocket 306 (e.g., formed by the groove 308 and portions 310, 312, and 314) generally extends along the interface between the fuel nozzle housing 56 and the plate 198, thereby providing a working seal that is able to expand and contract in the axial direction 304.

In certain embodiments, the resilient metallic seal 300 (e.g., metallic bellows 302) may be fixed or unfixed (i.e., free to move) relative to the fuel nozzle housing 56 and/or the plate 198. For example, the seal 300 may have opposite first and second end portions 316 and 318, which may be welded, brazed, bolted, or otherwise fixed to the groove 308 and peripheral portion 310. However, one or both of the end portions 316 and 318 may not be fixed to the fuel nozzle housing 56 or plate 198. Furthermore, the resilient metallic seal 300 (e.g., metallic bellows 302) may have one or more flexible turns, bends, curves, folds, or generally axially adjustable turns 320 in the wall 303, such that the turns 320 enable the seal 300 to expand and contract in the axial direction 304. In the illustrated embodiment, the resilient metallic seal 300 (e.g., metallic bellows 302) has multiple alternating turns 320 that define a wave pattern 322. For example, the illustrated seal 300 reverses direction five times, thereby defining five axially adjustable turns 320 in the wall 303. Additionally, the end portions 316 and 318 maybe oriented in the radial direction 42. With the end portions 316 and 318 oriented in the radial direction 42, the resilient metallic seal 300 may facilitate sealing between the plate 198 and the fuel nozzle housing 56. Specifically, if the pressure of the fuel in chamber 270 exceeds the pressure of the air opposite the wall 198 the metallic bellows 302 may expand in the axial direction 40, thus maintaining the seal. However, if the end portion 316 and 318 were oriented in the opposite direction the metallic bellows 302 could contract if the pressure of the fuel in chamber 270 is greater than the pressure of the air on the opposite side of the plate 198, thus reducing the sealing force of the metallic seal 300. For this reason, the orientation of the end portions 316 and 318 may change depending on differing fluid pressures on opposite sides of the plates 194, 196, 198. For example, the metallic seals 300 coupled to plates 194 and 196 may be a metallic bellows 302 with end portions 316 and 318 oriented opposite that shown in FIG. 10. This may increase the ability of the metallic seals 300 in contact with the plates 194 and 196 to maintain a seal with the housing 56 when the fluid pressures on opposite sides of the plates 194 and 196 differ. In other embodiments, the seal 300 may include a single axially adjustable turn 320, or any number of axially adjustable turns 320 (e.g., 1 to 100 turns). Thus, the turns 320 of the seal 300 may define a C-shape, a U-shape, a V-shape, a W-shape, an E-shape, or any type of oscillating pattern. In other embodiments, the seal 300 may have an O-shape or J-shape. A larger number of turns 320 in the resilient metallic seal 300 may increase the range of axial movement 304. The resilient metallic seal 300 may be made of any suitable metal for high-temperature applications, such as, stainless steel grade 321, stainless steel grade 347, stainless steel A-286, nickel alloys, cobalt alloys, and nickel-chromium based super-alloys (e.g., Inconel® X-750), or any combination thereof.

Figure 11:
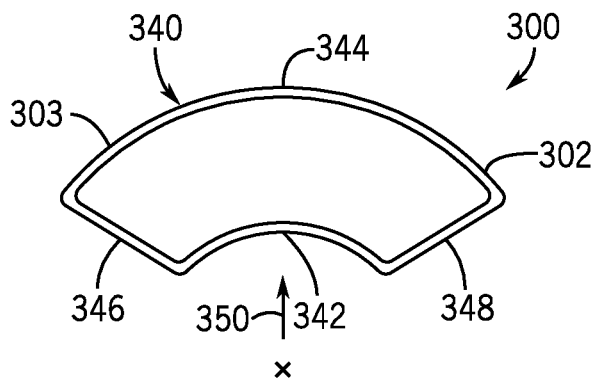
FIG. 11 is a front end view of an embodiment of a resilient metallic seal having a sector shaped configuration suitable for the sector fuel nozzles of FIGS. 4 and 5.

FIG. 11 is a front end view of an embodiment of a resilient metallic seal 300 having a sector shaped configuration 340 (e.g., a truncated-pie shape) suitable for the multi-tube fuel nozzles 94 of FIGS. 4-6. As illustrated, the sector shaped configuration 340 includes a wedge shape or truncated-pie shape with two generally parallel sides 342 and 344 and two non-parallel sides 346 and 348. The sides 342 and 344 are arcuate shaped, while sides 346 and 348 are linear (e.g., diverging in radial direction 350). However, in certain embodiments, the sector shaped configuration 340 of the seal 300 may include other shapes, e.g., a pie shape with three sides. Furthermore, some embodiments of the seal 300 may be shaped as a circle, a rectangle, a triangle, or other geometry. In the embodiment of FIG. 8 the multi-tube fuel nozzles 94 and associated seals 300 may be segmented into three sectors around a central fuel nozzle 12. However, the outer multi-tube fuel nozzles 94 and associated seals 300 may be divided into any number of sectors, e.g., 1, 2, 3, 4, 5, 6, 7, 8, 9, 10, or more sectors.

Figure 12:
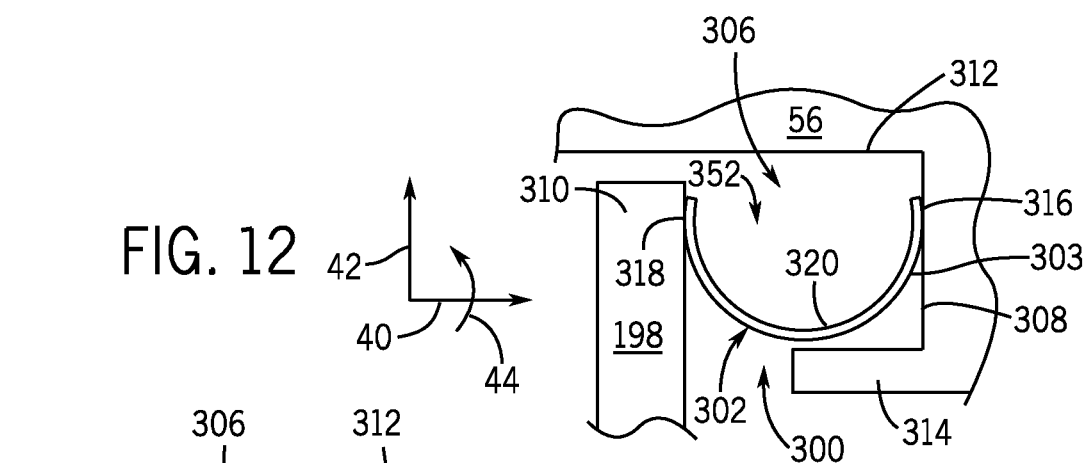
FIG. 12 is a sectional view of the fuel nozzle of FIG. 9 along line 10-10, illustrating an embodiment of a resilient metallic seal having a single turn or bend.
Figure 13:
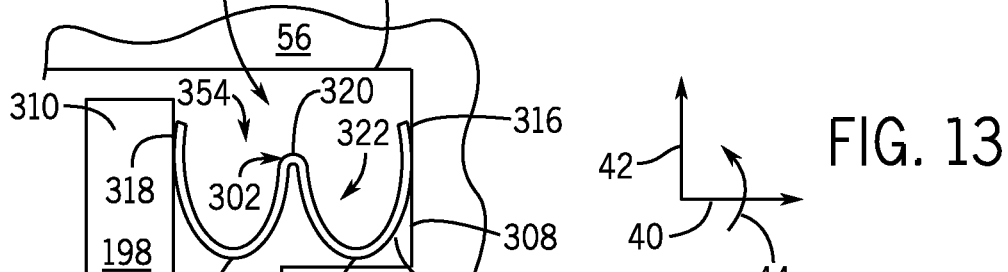
FIG. 13 is a sectional view of the fuel nozzle of FIG. 9 along line 10-10, illustrating an embodiment of a resilient metallic seal having multiple turns or bends.
Figure 14:
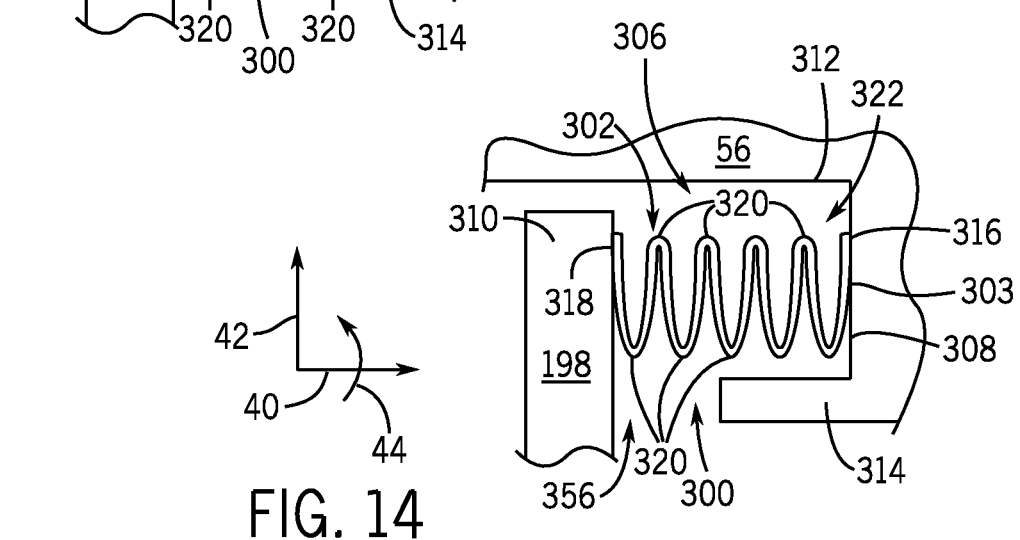
FIG. 14 is a sectional view of the fuel nozzle of FIG. 9 along line 10-10, illustrating an embodiment of a resilient metallic seal having multiple turns or bends defining a bellows.

FIGS. 12, 13, and 14 are partial cross-sectional side views of the multi-tube fuel nozzle 94 of FIG. 9, illustrating embodiments of the resilient metallic seal 300 (e.g., metallic bellows 302) having different numbers of axially adjustable turns 320 in the wall 303. For example, FIG. 12 is a partial cross-sectional side view of the fuel nozzle 12 of FIG. 9, illustrating an embodiment of the resilient metallic seal 300 having a single turn or bend 320 (e.g., a U-shape or C-shape 352). FIG. 13 is a partial cross-sectional side view of the multi-tube fuel nozzle 94 of FIG. 9, illustrating an embodiment of the resilient metallic seal 300 having multiple turns or bends 320 defining a wave pattern 322, e.g., an E-shape or W-shape 354. FIG. 14 is a partial cross-sectional side view of the multi-tube fuel nozzle 94 of FIG. 9, illustrating an embodiment of the resilient metallic seal 300 having multiple turns or bends 320 defining an even greater wave pattern 322 than FIG. 10. In particular, the wave pattern 322 of FIG. 14 has 9 turns or bends 320, which may be described as a wave, oscillating, or zigzagging pattern 356. In other embodiments, the pattern 356 may have any number of turns or bends 320. For example, in applications with greater temperature differentials, a resilient metallic seal 300 (e.g., metallic bellows 302) with a large number of turns 320 may be used to allow for greater axial movement while still maintaining a working seal between the fuel nozzle housing 56 and the plate 198 of the multi-tube fuel nozzle 94. Again, in each embodiment of FIGS. 12, 13, and 14, the opposite end portions 316 and 318 may be either fixed or unfixed (i.e., able to move) relative to the fuel nozzle housing 56 and plate 198. For example, one of the end portions 316 and 318 may be fixed while the other end portion is unfixed, thereby simplifying the installation and removable of the fuel nozzles 12.

Figure 15:
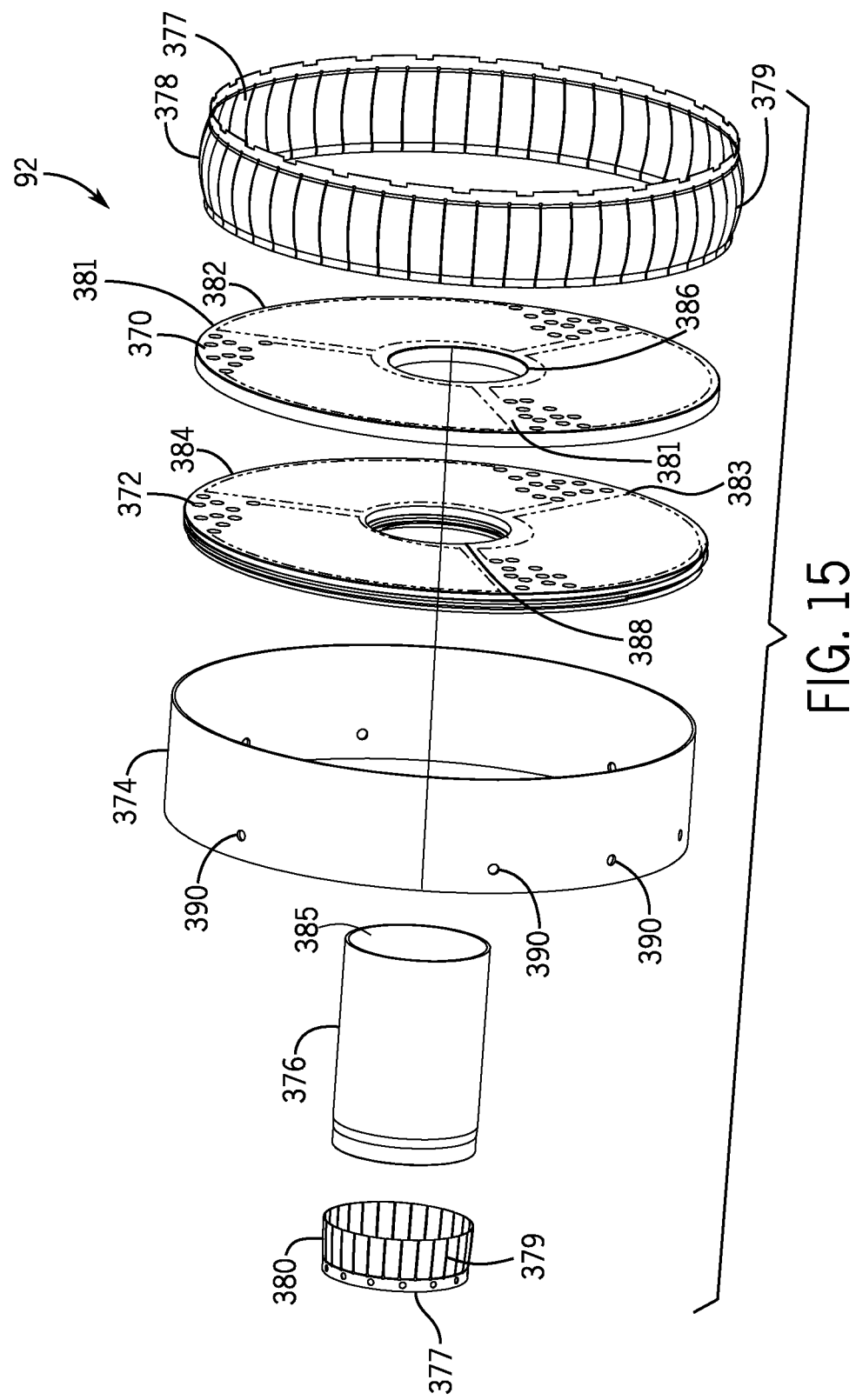
FIG. 15 is an exploded perspective view of an aft plate assembly according to an embodiment.

FIG. 15 is an exploded perspective view of an aft plate assembly 92. The aft plate assembly 92 shields and cools the multi-tube fuel nozzles 94 from the combustion reaction of the fuel-air mixture 262 in the combustion zone 84, such that the aft plate assembly 92 helps to extend the operational life of the multi-tube fuel nozzles 94. The aft plate assembly 92 includes an aft plate 370; an impingement plate 372; a first cylinder 374 (e.g., an outer wall); a second cylinder 376 (e.g., an inner wall); and a first hoop seal 378 (e.g., hula seal) and a second hoop seal 380 (e.g., hula seal). The hoop seals 378 and 380 are generally annular seals, which have an annular wall 377 that increases then decreases in diameter to define an arcuate cross-section or spring element 379. The accurate cross-section 379 helps to accommodate thermal expansion and contraction in a radial direction while maintaining a seal. As illustrated, the aft plate 370 and impingement plate 372 include respective tube apertures 382 and 384, which enable attachment of the aft plate assembly 92 over the tubes 192 of the multi-tube fuel nozzle 94. The aft plate 370 and impingement plate 372 may also include respective central nozzle apertures or passages 386 and 388. The central nozzle apertures 386 and 388 enable the second cylinder 376 to extend through the impingement plate 372 and the aft plate 370 and receive the central fuel nozzle or pilot nozzle 96 through a central passage 385. The aft plate assembly 92 attaches to the fuel nozzle housing 56 with pins 162 (see FIG. 9), which couple to the first cylinder 374 through apertures 390 (e.g., radial mount). The pins 162 enable the aft plate assembly 92 to grow radially, but block rotation or movement towards the aft end of the combustor 12. Furthermore, the pinned configuration enables easy replacement of the aft plate 370 or other portions of the aft plate assembly 92.

In the illustrated embodiment, each of the plates 370 and 372 receives all of the mixing tubes 192 for the fuel nozzles 94 in multiple receptacles (e.g., three sector shaped and/or truncated pie shaped arrangements) of the fuel nozzle housing 56. In other words, rather than providing a separate plate for each of the receptacles 190, the illustrated embodiment shares the plates 370 and 372 across all of the receptacles 190, thereby defining a unified plate 370 and a unified plate 372. The unified aft plate 370 has tube apertures 382 disposed across substantially all of the plate 370 in sectors (e.g., pie-shaped sectors) separated by sector dividers 381 (e.g., radial divider space), which generally align with the divider walls 242 between the receptacles 190. Similarly, the unified impingement plate 372 has tube apertures 384 disposed across substantially all of the plate 372 except for sector dividers 383, which generally align with the divider walls 242 between the receptacles 190. Thus, the unified construction of the aft plate 370 and impingement plate 372 helps to increase the coverage of tube apertures 382 for mixing tubes 192, while also reducing the number of potential leak paths. The unified plates 370 and 372 also simplify the construction, installation, removal, and servicing of the micro mixer system 16, and particularly the installation and removal of tubes 192.

FIG. 16 is a sectional view of the micro mixer system 16 along line 16-16 of FIG. 9 according to an embodiment. As illustrated, the aft plate assembly 92 is assembled with the aft plate 370 coupled to the impingement plate 372, and the impingement plate 372 coupled to the first cylinder 374. The aft plate 370, impingement plate 372, and the first cylinder 374 may be coupled by welding, brazing, or fasteners (e.g., threaded fasteners). Once assembled, the aft plate assembly 92 couples to the fuel nozzle housing 56 with pins 162 that extend through apertures 164 in the fuel nozzle housing 56 and apertures 390 in the first cylinder 374. Air flow is restricted between the aft plate assembly 92 and the combustion liner 72 with the hoop seal 378. As mentioned above, the aft plate assembly 92 enables cooling and may block direct contact between the combustion of the fuel air mixture 262 in the combustion zone 84 and the tubes 192 of the multi-tube fuel nozzles 94. Accordingly, the aft plate 370 may be made out of a material capable of withstanding high temperatures for long periods of time (e.g., hastalloy X, haynes 188, cobalt chromium, inconnel, etc.). In addition, the aft plate 370 may include a coating such as a thermal barrier coating (TBC) 400 to provide additional thermal protection to reduce thermal wear on the aft plate 370 and limit heat transmission to the tubes 192.

The aft plate assembly 92 may also form an air cooling chamber 402 in combination with the plate 198. As explained above, the fuel nozzle housing 56 includes radial air cooling apertures 128 that enable compressed air 76 traveling through the annular space 74 to enter the air cooling chamber 402. When the airflow 76 enters the chamber 402, the airflow 76 swirls around and convectively cools the tubes 192 (i.e., transfers heat away from the tubes 192). In addition, the airflow 76 may assist in removing any fuel 260 that is potentially leaking into the air cooling chamber 402 between the tubes 192 and the wall 198, thus substantially reducing or eliminating fuel buildup behind the aft plate 370. The chamber 402 directs the cooling airflow 76 in direction 404 towards the impingement plate 372. As illustrated, the impingement plate 372 is offset from the aft plate 370 to form a space 406. The space 406 creates a pressure drop to attract airflow 76 through impingement apertures 408. When the airflow 76 passes through the impingement plate 372, the airflow 76 impinges against a fore end side 410 of the aft plate 370 for impingement cooling of the aft plate 370. After impingement cooling the fore end side 410 of the impingement plate 370, the airflow 76 may exit through effusion cooling apertures and/or between the aft plate 370 and the tubes 192. As the cooling air 76 exits the aft plate assembly 92, the airflow 76 transfers heat and possible fuel into the combustion zone 84, thus protecting the micromixer system 16 from thermal wear.

In other embodiments, the aft plate assembly 92 may not include an impingement plate 372. Accordingly, the cooling airflow 76 may directly contact the fore end side 410 of the aft plate 370, and then exit through gaps between the tubes 192 and the aft plate 370 and/or through effusion cooling apertures. Even with cooling, the aft plate 370 may become hotter than other components in the micro-mixer system 16. However, the pin attachment to the fuel nozzle housing 56 enables the aft plate assembly 92 to grow radially, but blocks rotation and downstream axial movement. Accordingly, the micromixer system 16 reduces or blocks mechanical loads and stresses between the aft plate assembly 92 and the fuel nozzle housing 56.

FIG. 17 is a sectional view of an aft plate 370 including tube apertures 382 and effusion cooling apertures 420. As explained above, after the cooling air 76 impinges against the fore end side 410 of the aft plate 370, the cooling airflow 76 may exit through effusion cooling apertures 420 and/or through the tube apertures 382. As illustrated, the tube apertures 382 have a width 422 and the tubes 192 have a width 424. The difference 426 between the widths 422 and 424 creates an annular space 428 for the cooling airflow 76 to exit the micro-mixer system 16 through the aft plate 370. The cooling airflow 76 may also exit through effusion cooling apertures 420. The effusion cooling apertures 420 may be located between some or all of the tube apertures 382. In some embodiments, there may more than one effusion cooling aperture 420 between each of the adjacent tube apertures 382 (e.g., 1, 2, 3, 4, 5, or more). The effusion cooling apertures 420 may be perpendicular to the aft plate 370 or form an angle with respect to a plane 432 of the aft plate 370. For example, the angles 430 and 431 of the effusion cooling apertures may be approximately 30-150, 50-130, 70-110, 80-100, 30, 45, 60, 75, or 90 degrees with respect the plane 432. In operation, the effusion cooling apertures 420 enable a thin film of cooling airflow to cover the aft end 434 of the aft plate 370. The cooling air film may assist in protecting the aft plate 370 from the combustion reaction in the combustor 12. While FIG. 17 illustrates an aft plate 370, the same cooling features may apply to the impingement plate 372. Specifically, the impingement apertures 408 of the impingement plate 372 may form an angle with respect to a plane of the impingement plate 372. The impingement plate 372 may also include multiple impingement apertures 408 between the tube apertures 384 (e.g., 1, 2, 3, 4, 5, or more impingement apertures) to more effectively cool the aft plate 370.

FIG. 18 is a rear perspective view of an inlet flow conditioner 90. As explained above, the inlet flow conditioner 90 functions as a filter, preventing debris from entering the multi-tube fuel nozzles 94, and enables approximately even distribution of airflow to each of the tubes 192 in the multi-tube fuel nozzles 94. The inlet flow conditioner 90 includes a first cylinder 450 (e.g., outer wall), a second cylinder 452 (e.g., an inner wall), and a plate 454 that couples the first cylinder 450 to the second cylinder 452. As illustrated, the first cylinder 450 includes apertures 158 that enable the inlet flow conditioner 90 to couple to the fuel nozzle housing 56. In addition, the first cylinder 450 may also include airflow apertures 456 (e.g., radial apertures) spaced apart from one another axially 40 and circumferentially 44 along the first cylinder 450. The apertures 456 may have a diameter smaller than a diameter of the tubes 192 in the multi-tube fuel nozzle 94. The difference in diameter enables the inlet flow conditioner 90 to block debris in the compressed air 76 from passing through the inlet flow conditioner 90 and entering the tubes 192. In the present embodiment, the airflow apertures 456 are positioned near the plate 454. However, in other embodiments, the airflow apertures 456 may be positioned on the first cylinder 450 opposite the plate 454, or the airflow apertures 456 may be positioned at any point about the circumference of the first cylinder 450. In the illustrated embodiment, the airflow apertures 456 are circular; however, in other embodiments the apertures may be rectangular, square, or oval. Furthermore, the apertures 456 may be arranged in different patters (e.g., rows) around the first cylinder 450.

The plate 454 also may include multiple airflow apertures 458 (e.g., axial apertures). The airflow apertures 458, like apertures 456, may have a diameter smaller than a diameter of the tubes 192 of the multi-tube fuel nozzle 94. The difference in diameter enables the inlet flow conditioner 90 to block debris in the compressed air 76 from passing through the inlet flow conditioner 90 and entering the tubes 192. As explained above, the micro-mixer system 16 delivers fuel radially 42 to the multi-tube fuel nozzles 94. Accordingly, the area of the plate 454 may be substantially filled with airflow apertures 458, thus reducing pressure losses as the compressed air 76 passes through the inlet flow conditioner 90. Like the airflow apertures 456, the airflow apertures 458 may be circular, rectangular, square, or oval. Furthermore, the airflow apertures 458 may be arranged in patterns (e.g., concentric circular rows) about the second cylinder 452. However, in different embodiments, the airflow apertures 458 may be arranged differently. The second cylinder 452 rests within the plate 454 and defines a central fuel nozzle aperture 460. The central fuel nozzle aperture 460 enables a central fuel nozzle or pilot fuel nozzle 96 to pass through the inlet flow conditioner 90 and into the fuel nozzle housing 56. In other embodiments, the inlet flow conditioner 90 may not include a central fuel nozzle aperture 460, but may instead include additional airflow apertures 458 that feed compressed air 76 into the multi-tube fuel nozzles 94.

Figure 19:
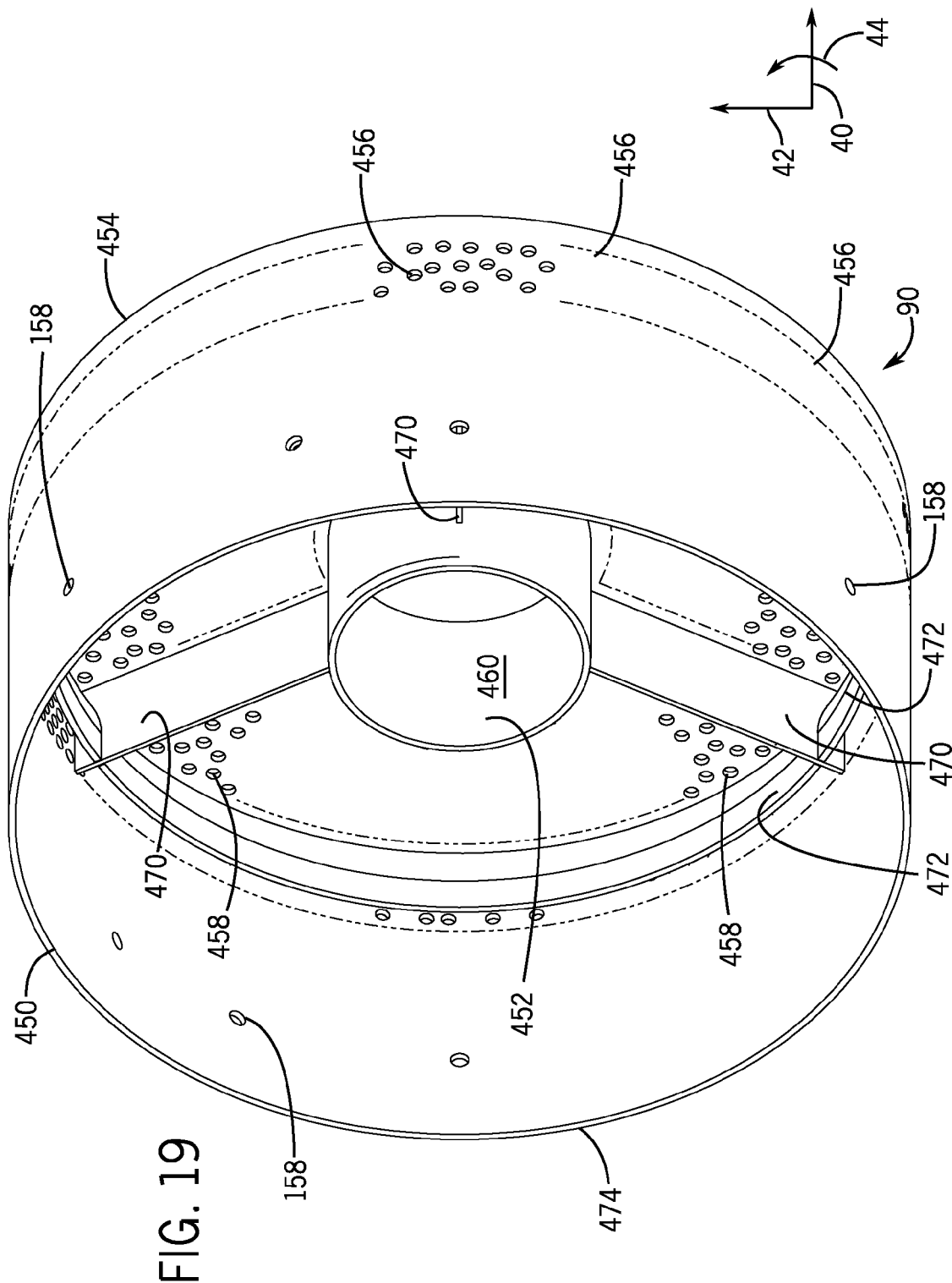
FIG. 19 is a front perspective view of an inlet flow conditioner according to an embodiment.

FIG. 19 is a front perspective view of the inlet flow conditioner 90 of FIG. 18. As illustrated, the inlet flow conditioner 90 includes divider walls or support plates 470 (e.g., radial supports). The support plates 470 couple to the first cylinder 450, the second cylinder 452, the plate 454, and to turning guides 472 (e.g., turning guide vanes, baffles, or walls). The support plates 470 may couple by welding, brazing, or fasteners (e.g., threaded fasteners) to provide additional support for the turning guides 472 and the second cylinder 452. In addition to providing support, the support plates 470 may assist in channeling airflow passing through the apertures 458 in the front plate 454 to a specific receptacle 190 and multi-tube fuel nozzle 94. In the present embodiment, the inlet flow conditioner 90 includes three support plates 470 corresponding to three multi-tube fuel nozzles 94 in the fuel nozzle housing 56. However, in other embodiments there may be additional support plates 470 (e.g., 1, 2, 3, 4, 5, 6, 7, 8, 9, 10 or more) that may correspond to the number of receptacles 190 and multi-tube fuel nozzles 94. Furthermore, the support plates 470 may extend from the plate 454 to an opposite end 474 of the first cylinder 450, thus dividing the airflow passing through the inlet flow conditioner 90 between the multi-tube fuel nozzles 94.

Similar to the plates 370 and 372 of the aft plate assembly 92, the inlet flow conditioner 90 shown in FIGS. 18 and 19 may be a unified (e.g., one-piece) structure, which is shared among the multiple receptacles 190, multiple fuel nozzles 94, and all of the tubes 192. In other words, the apertures 458 may cover substantially all of the plate 454 except for the support plates 470, which generally align with the divider walls 242 between the receptacles 190. Thus, the apertures 458 may help to supply the airflow substantially evenly across the entire plate 458 in an axial direction 40 toward the mixing tubes 192, while the apertures 456 help to supply the airflow substantially evenly around the first cylinder 450 in a radial direction 42 toward the mixing tubes 192. Again, the apertures 456 and 458 help to distribute the airflow more evenly to all of the tubes 192, such that each tube 192 receives a substantially equal amount of air flow. In addition, the unified construction of the inlet flow conditioner 90 simplifies the construction, installation, removal, and servicing of the fuel nozzles 94 and the mixing tubes 192.

As mentioned above, the inlet flow conditioner 90 includes turning guides 472. The turning guides 472 may help to direct airflow to the radial outermost tubes 192 of the multi-tube fuel nozzles 94. Specifically, the turning guides 472 may direct airflow from the airflow apertures 456 in the first cylinder 450. In still other embodiments, the turning guides 472 may direct airflow from the apertures 456 and 458 to the radial outermost tubes 192 of the multi-tube fuel nozzle 94, thus enabling approximately even distribution of airflow to each of the tubes 192 in the multi-tube fuel nozzles 94.

Figure 20:
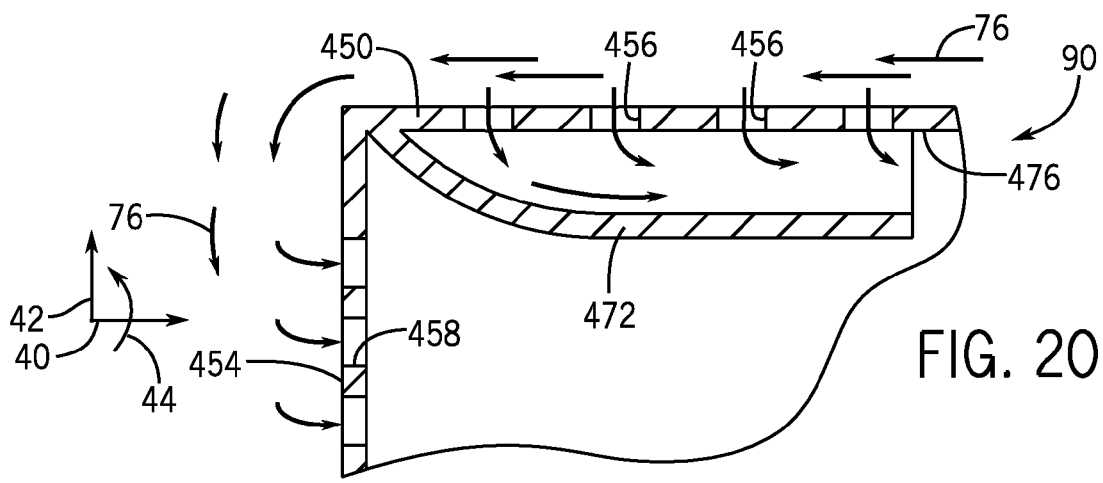
FIG. 20 is a partial cross-sectional view of an inlet flow conditioner according to an embodiment.

FIG. 20 is a sectional view of an inlet flow conditioner 90. As illustrated, the turning guide 472 redirects airflow entering the inlet flow conditioner 90 through the apertures 456. Specifically, as airflow 76 enters the inlet flow conditioner 90 through the apertures 456, the airflow contacts the turning guide 472. The turning guide 472 turns and directs the airflow 76 to flow along the interior surface 476 of the inlet flow conditioner 90. With the airflow traveling near the interior surface 476, the inlet flow conditioner 90 enables the radial outermost tubes 192 to receive approximately the same amount of airflow as the radial innermost tubes 192 of the multi-tube fuel nozzles 94. In the present embodiment, the turning guide 472 turns the airflow entering the inlet flow conditioner 90 through the apertures 456. However, in other embodiments, the turning guide 472 may also turn airflow entering the inlet flow conditioner 90 through some of the apertures 458 in the plate 454.

Figure 21:
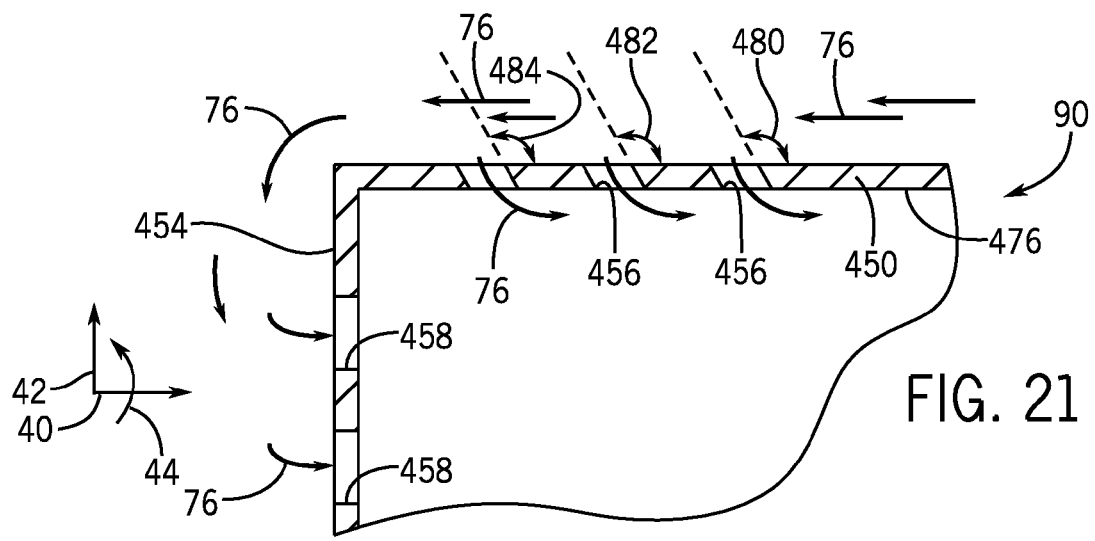
FIG. 21 is a partial cross-sectional view of an inlet flow conditioner according to an embodiment.

FIG. 21 is a sectional view of an embodiment of the inlet flow conditioner 90. In the illustrated embodiment, the inlet flow conditioner 90 does not have a turning guide that channels airflow into the radial outermost tubes 192 of the multi-tube fuel nozzle 94. Instead, the airflow apertures 456 form angles 480, 482, and 484 with the first cylinder 450, wherein the angles 480, 482, and 484 are generally oriented in the downstream direction toward the tubes 192. The angle of the apertures 456 redirects the airflow entering the inlet flow conditioner 90. More specifically, the angle of the apertures 456 encourages airflow to flow near the inner surface 476 of the inlet flow conditioner 90, thus supplying the radial outermost tubes 192 approximately the same amount of airflow that the radial innermost tubes 192 receive. The angles 480, 482, and 484 may be approximately 90-170, 110-150, or 130-140 degrees, or greater than approximately 100, 120, 140, or 160 degrees. In some embodiments, the apertures 456 may have different angles, thus encouraging the airflow through different apertures 456 to flow closer or further away from the inner surface 476. For example, each of the angles 480, 482, and 484 may differ from one another, or some of the angles 480, 482, and 484 may be equal to one another. In another embodiment, angles 480, 482, and 484 may gradually increase from one aperture 456 to another in the axial direction 40. In still another embodiment, the angles 480, 482, and 484 may gradually decrease from one aperture 456 to another in the axial direction 40. In each of these embodiments, the angles of the aperture 456 may help to provide approximately equal amounts airflow to each of the tubes 192 in the multi-tube fuel nozzle 94.

Figure 22:
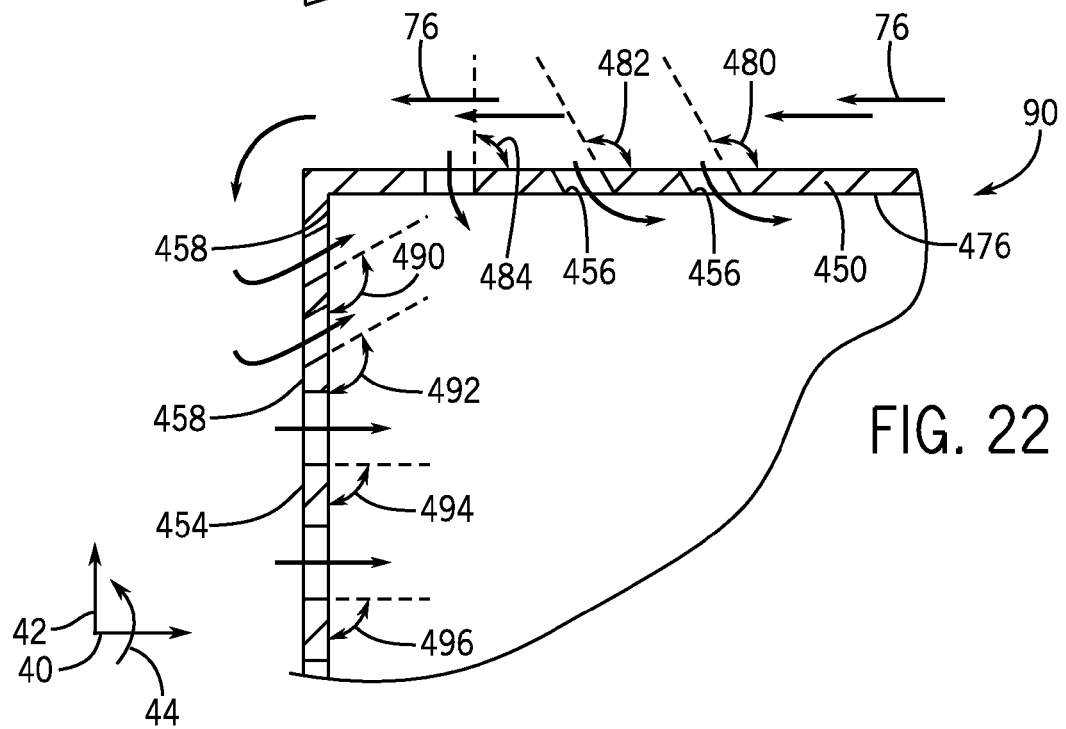
FIG. 22 is a partial cross-sectional view of an inlet flow conditioner according to an embodiment.

FIG. 22 is a sectional view of an embodiment of the inlet flow conditioner 90. Similar to the embodiment in FIG. 22, the inlet flow conditioner 90 of FIG. 22 does not include a turning guide. Instead, the inlet flow conditioner 90 includes apertures 456 and 458 that form respective angles with the first cylinder 450 and the plate 454. Specifically, apertures 456 form angles 480, 482, and 484 with the first cylinder 450 while apertures 458 form angles 490, 492, 494, and 496. In the present embodiment, two of the apertures 456 have angles greater than ninety degrees, while the third aperture is ninety degrees with respect to the first cylinder 450. In addition, some of the apertures 458 form an angle greater than 90 degrees (e.g., angles 490 and 492) with the plate 454, while the remaining apertures 458 form ninety degree angles 494 and 496. The combination of the two apertures 458 with non-perpendicular angles 490 and 492 and the apertures 456 that form non-perpendicular angles 482 and 484, all of which are greater than 90, 100, 110, 120, 130, 140, 150, 160, or 170 degrees, increase the airflow along the interior surface 476 of the first cylinder 450 to the radial outermost tubes 192 of the multi-tube fuel nozzles 94. Accordingly, the apertures 456 in the first cylinder 450 and the apertures 458 along the plate 454 may increase airflow to the radial outermost tubes 192 of the multi-tube fuel nozzles 94, thus enabling approximately equal amounts of airflow into the tubes 192 of the multi-tube fuel nozzle 94. The angles 480, 482, 484, 490, 492, 494, and 496 may be approximately 90-170, 110-150, 130-140 degrees, or approximately 90, 100, 110, 120, 130, 140, 150, 160, or 170 degrees. In some embodiments, the apertures 456 and 458 may have different angles, thus directing the airflow through different apertures 456 and 458 to flow closer or further away from the inner surface 472. For example, each of the angles 480, 482, 484, 490, 492, 494, and 496 may differ from one another, or may differ with respect to some of the angles 480, 482, 484, 490, 492, 494, and 496. In another embodiment, angles 480, 482, and 484 may gradually increase from one aperture to another in the axial direction 40. In still another embodiment, the angles 480, 482, and 484 may gradually decrease from one aperture to another in the axial direction 40. The angles 490, 492, 494, and 496 may also gradually increase in angle from one aperture to another in the radial direction 42 or gradually decrease in angle from one aperture to another in the radial direction 42. Moreover, only some of the apertures 456 and 458 may form an angle greater than 90 degrees, while the remaining apertures form 90 degree angles with the first cylinder 450 and the second cylinder 454. With each of the tubes 192 receiving approximately equal amounts of airflow, via the flow conditioner 90 the multi-tube fuel nozzles 94 mix and distribute the fuel-air mixture in a suitable ratio for optimal combustion, emissions, fuel consumption, and power output. Specifically, the micro-mixer system 16 may reduce levels of undesirable emissions (e.g., NOx, CO, $CO_2$, etc.) from a gas turbine system.

Technical effects of the invention include a modular micro-mixer system. The modular micro-mixer system facilitates inspection, maintenance, and replacement of individual components including the multi-tube fuel nozzles, the inlet flow conditioner, the aft plate assembly, and the resilient metallic seal (e.g., a metallic bellows). As explained above, the fuel nozzle housing supports the individual components while radially providing fuel to the multi-tube fuel nozzles. Radial fuel delivery enables use of a simplified end plate on the combustor, and increases the available space usable by the tubes of the multi-tube fuel nozzles. Other technical effects include the inlet flow conditioner capable of filtering debris from compressed air and enabling approximately equal amounts of airflow into each of the tubes in the multi-tube fuel nozzles. In addition, the micro-mixer system includes the aft plate assembly configured to create a cooling air chamber capable of convectively cooling the multi-tube fuel nozzles as well as shield the multi-tube fuel nozzles from direct contact with the combustion reaction in the combustion zone. Finally, the resilient metallic seal reduces or blocks wear from temperature gradients within the multi-tube fuel nozzle. Specifically, the resilient metallic seal (e.g., metallic bellows) may expand or contract in an axial direction to lessen the effects of thermal expansion or contraction of the tubes, while maintaining a continuous working seal between the fuel nozzle housing and the multi-tube fuel nozzles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
  a multi-tube fuel nozzle, comprising:
    a first plate having a first plurality of openings spaced apart from one another;
    a plurality of tubes extending through the first plurality of openings in the first plate, wherein each tube of the plurality of tubes comprises an air inlet, a fuel inlet, and a fuel-air mixture outlet; and
    a resilient metallic seal disposed along the first plate about the plurality of tubes, wherein the resilient metallic seal comprises at least one axially adjustable turn; and
  a housing having a wall surrounding the multi-tube fuel nozzle, wherein the resilient metallic seal is disposed between the wall and the first plate of the multi-tube fuel nozzle, and the at least one axially adjustable turn is configured to expand or contract in an axial direction in response to axial movement between the wall and the first plate of the multi-tube fuel nozzle.
2. The system of claim 1, comprising a combustor having the multi-tube fuel nozzle.
3. The system of claim 2, wherein the combustor is a gas turbine combustor.

4. The system of claim 2, comprising a gas turbine engine having the combustor with the multi-tube fuel nozzle.

5. The system of claim 1, wherein the multi-tube fuel nozzle comprises a second plate having a second plurality of openings spaced apart from one another, the plurality of tubes extends through the second plurality of openings in the second plate, the first and second plates are axially offset relative to one another by an axial offset distance, and the resilient metallic seal is configured to expand or contract in the axial direction due to axial movement between the first plate and the second plate, a first ring structure surrounding the plurality of tubes, or a combination thereof.

6. The system of claim 5, wherein the first and second plates are coupled to the plurality of tubes at the axial offset distance, and the resilient metallic seal is configured to expand or contract in the axial direction due to thermal expansion or thermal contraction of the plurality of tubes between the first and second plates.

7. The system of claim 1, wherein the at least one axially adjustable turn curves from a radially inward direction to a radially outward direction relative to an axis of the multi-tube fuel nozzle.

8. The system of claim 1, wherein the at least one axially adjustable turn comprises a plurality of alternating turns that define a wave pattern.

9. The system of claim 1, wherein the resilient metallic seal is coupled to the first plate.

10. The system of claim 9, wherein the resilient metallic seal is coupled to the wall of the housing.

11. The system of claim 1, wherein the wall of the housing comprises a first ring structure surrounding a first chamber having the plurality of tubes, wherein the first ring structure comprises a groove and a protrusion extending around the first chamber, and the resilient metallic seal is disposed in the groove between the first ring structure and the first plate.

12. The system of claim 1, wherein the wall of the housing surrounds an interior volume having the plurality of tubes, and the first plate divides the interior volume of the housing between first and second chambers having the plurality of tubes.

13. The system of claim 12, wherein the multi-tube fuel nozzle comprises a second plate having a second plurality of openings spaced apart from one another, the plurality of tubes extend through the second plurality of openings in the second plate, and the second plate divides the interior volume of the housing between the second chamber and a third chamber having the plurality of tubes.

14. The system of claim 13, wherein the multi-tube fuel nozzle comprises a third plate having a third plurality of openings spaced apart from one another, wherein the plurality of tubes extend through the third plurality of openings in the third plate, wherein the first, second, and third plates are axially offset relative to one another, wherein the third plate divides the interior volume of the housing between the third chamber and a fourth chamber having the plurality of tubes.

15. The system of claim 13, wherein the second plate comprises one or more fuel flow apertures separate from the second plurality of openings, one or more fuel flow spaces between the second plurality of openings and the plurality of tubes, or a combination thereof.

16. The system of claim 12, wherein the housing comprises a radial fuel inlet into the second chamber.

17. The system of claim 1, wherein the at least one axially adjustable turn is captured in a pocket between the wall and the first plate.

18. The system of claim 17, wherein the pocket comprises axially opposite structures and radially opposite structures relative to the axis of the multi-tube fuel nozzle.

19. A system, comprising:
a multi-tube fuel nozzle, comprising:
a plurality of fuel-air mixing tubes spaced apart from one another within a chamber, wherein each tube of the plurality of fuel-air mixing tubes comprises an air inlet, a fuel inlet in a sidewall of the tube, and a fuel-air mixture outlet; and
a resilient metallic seal disposed along an outer perimeter about the plurality of fuel-air mixing tubes, wherein the resilient metallic seal comprises at least one axially adjustable turn that curves from a radially inward direction to a radially outward direction relative to an axis of the multi-tube fuel nozzle, and the at least one axially adjustable turn is configured to expand or contract in an axial direction in response to axial movement of the plurality of fuel-air mixing tubes.

20. The system of claim 19, wherein the at least one axially adjustable turn comprises a plurality of alternating turns that define a wave pattern.

21. The system of claim 19, wherein the at least one axially adjustable turn is configured to expand or contract in the axial direction in response to thermal expansion or thermal contraction of the plurality of fuel-air mixing tubes.

22. The system of claim 19, comprising a combustor, a gas turbine engine, or a combination thereof, having the multi-tube fuel nozzle.

23. A method, comprising:
sealing a multi-tube fuel nozzle to a surrounding structure via a resilient metallic seal having at least one axially adjustable turn that curves from a radially inward direction to a radially outward direction relative to an axis of the multi-tube fuel nozzle, wherein the multi-tube fuel nozzle comprises a plurality of tubes spaced apart from one another, each tube of the plurality of tubes having an air inlet, a fuel inlet in a sidewall of the tube, and a fuel-air mixture outlet; and
expanding or contracting the at least one axially adjustable turn of the resilient metallic seal in an axial direction, while sealing, in response to thermal expansion or thermal contraction of the plurality of tubes or the surrounding structure in the axial direction.

24. The method of claim 23, wherein expanding or contracting the at least one axially adjustable turn of the resilient metallic seal comprises expanding or contracting a plurality of axially adjustable turns of the resilient metallic seal.

25. The method of claim 23, comprising capturing the at least one axially adjustable turn of the resilient metallic seal within a pocket between the plurality of tubes and the surrounding structure.

26. The method of claim 25, wherein capturing the at least one axially adjustable turn of the resilient metallic seal within the pocket comprises surrounding the at least one axially adjustable turn with axially opposite structures and radially opposite structures relative to the axis of the multi-tube fuel nozzle.

27. A system, comprising:
a multi-tube fuel nozzle, comprising:
a first plate having a first plurality of openings;
a plurality of tubes extending through the first plurality of openings in the first plate, wherein each tube of the plurality of tubes comprises an air inlet, a fuel inlet, and a fuel-air mixture outlet; and a resilient metallic seal disposed along the first plate about the plurality of tubes; and a first ring structure surrounding a first chamber having the plurality of tubes, wherein the first ring structure comprises a groove and a protrusion extending around the first chamber, and the resilient metallic seal is disposed in the groove between the first ring structure and the first plate.

* * * * *